United States Patent
Sullivan

(10) Patent No.: US 7,801,383 B2
(45) Date of Patent: Sep. 21, 2010

(54) EMBEDDED SCALAR QUANTIZERS WITH ARBITRARY DEAD-ZONE RATIOS

(75) Inventor: Gary Joseph Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 10/846,140

(22) Filed: May 15, 2004

(65) Prior Publication Data

US 2005/0254719 A1 Nov. 17, 2005

(51) Int. Cl.
*G06K 9/00* (2006.01)
*H04N 11/04* (2006.01)

(52) U.S. Cl. .................. 382/251; 375/240.03

(58) Field of Classification Search ......... 382/232–253; 270/273; 348/405, 14.13, 231.1; 375/240.03, 375/240.26, 240.11; 341/143
See application file for complete search history.

(56) References Cited

U.S. PATENT DOCUMENTS

| | | | |
|---|---|---|---|
| 4,583,114 A | 4/1986 | Catros | |
| 4,679,079 A | 7/1987 | Catros et al. | |
| 4,760,461 A | 7/1988 | Sato | |
| 4,774,574 A | 9/1988 | Daly et al. | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A | 8/1992 | Johnston et al. | |
| 5,144,426 A | 9/1992 | Tanaka et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,301,242 A | 4/1994 | Gonzales et al. | |
| 5,303,058 A | 4/1994 | Fukuda et al. | |
| 5,317,396 A | 5/1994 | Fujinami | |
| 5,317,672 A | 5/1994 | Crossman et al. | |
| 5,333,212 A | 7/1994 | Ligtenberg | |

(Continued)

FOREIGN PATENT DOCUMENTS

CA 1327074 2/1994

(Continued)

OTHER PUBLICATIONS

C. Chrysafis and A. Ortega, "Context-based Adaptive Image Coding". Proc. of the 30th Asilomar Conf. on Signals, Sys. and Computers, Pacific Grove, CA, Nov. 1996.*

(Continued)

*Primary Examiner*—Vu Le
*Assistant Examiner*—Andrae S Allison
(74) *Attorney, Agent, or Firm*—Klarquist Sparkman, LLP

(57) ABSTRACT

Embedded scalar quantizers for compression are described, along with tools for corresponding decompression. For example, a codec uses an embedded dead zone plus uniform threshold quantizer with repeated division of steps by specific factors. Non-dead-zone steps at a current level are divided into m+1 non-dead-zone steps at the next higher level, and the dead zone at the current level is divided into a dead zone at the next higher level with n new non-dead-zone steps at each side. Values for m and n depend on implementation. In some implementations, m=2 and n=1, and the dead zone ratio z=1, but other values are possible.

52 Claims, 13 Drawing Sheets

U.S. PATENT DOCUMENTS

| | | | |
|---|---|---|---|
| 5,374,958 A | 12/1994 | Yanagihara | |
| 5,412,429 A * | 5/1995 | Glover | 375/240.11 |
| 5,452,104 A | 9/1995 | Lee | |
| 5,461,421 A | 10/1995 | Moon | |
| 5,481,553 A | 1/1996 | Suzuki et al. | |
| 5,506,916 A | 4/1996 | Nishihara et al. | |
| 5,537,493 A | 7/1996 | Wilkinson | |
| 5,559,557 A | 9/1996 | Kato | |
| 5,565,920 A | 10/1996 | Lee et al. | |
| 5,587,708 A | 12/1996 | Chiu | |
| 5,606,371 A | 2/1997 | Gunnewick et al. | |
| 5,623,424 A | 4/1997 | Azadegan et al. | |
| 5,631,644 A | 5/1997 | Katata et al. | |
| 5,654,760 A | 8/1997 | Ohtsuki | |
| 5,657,087 A | 8/1997 | Jeong et al. | |
| 5,663,763 A | 9/1997 | Yagasaki et al. | |
| 5,731,836 A | 3/1998 | Lee | |
| 5,731,837 A | 3/1998 | Hurst, Jr. | |
| 5,739,861 A | 4/1998 | Music | |
| 5,751,358 A | 5/1998 | Suzuki et al. | |
| 5,751,379 A | 5/1998 | Markandey et al. | |
| 5,761,088 A | 6/1998 | Hulyalkar et al. | |
| 5,764,803 A | 6/1998 | Jacquin et al. | |
| 5,781,788 A | 7/1998 | Woo et al. | |
| 5,786,856 A | 7/1998 | Hall et al. | |
| 5,802,213 A | 9/1998 | Gardos | |
| 5,809,178 A | 9/1998 | Anderson et al. | |
| 5,815,097 A * | 9/1998 | Schwartz et al. | 341/51 |
| 5,819,035 A | 10/1998 | Devaney et al. | |
| 5,825,310 A | 10/1998 | Tsutsui | |
| 5,835,145 A | 11/1998 | Ouyang et al. | |
| 5,835,237 A | 11/1998 | Ebrahimi | |
| 5,844,613 A | 12/1998 | Chaddha | |
| 5,850,482 A * | 12/1998 | Meany et al. | 382/232 |
| 5,867,167 A | 2/1999 | Deering | |
| 5,870,435 A | 2/1999 | Choi et al. | |
| 5,883,672 A | 3/1999 | Suzuki et al. | |
| 5,926,791 A | 7/1999 | Ogata et al. | |
| 5,969,764 A | 10/1999 | Sun et al. | |
| 5,970,173 A | 10/1999 | Lee et al. | |
| 5,990,957 A | 11/1999 | Ryoo | |
| 6,044,115 A | 3/2000 | Horiike et al. | |
| 6,049,630 A | 4/2000 | Wang et al. | |
| 6,058,362 A | 5/2000 | Malvar | |
| 6,072,831 A | 6/2000 | Chen | |
| 6,084,636 A | 7/2000 | Fujiwara et al. | |
| 6,088,392 A | 7/2000 | Rosenberg | |
| 6,091,777 A * | 7/2000 | Guetz et al. | 375/240.11 |
| 6,104,751 A | 8/2000 | Artieri | |
| 6,118,817 A | 9/2000 | Wang | |
| 6,118,903 A | 9/2000 | Liu | |
| 6,125,140 A | 9/2000 | Wilkinson | |
| 6,148,107 A | 11/2000 | Ducloux et al. | |
| 6,148,109 A | 11/2000 | Boon et al. | |
| 6,160,846 A | 12/2000 | Chiang et al. | |
| 6,167,091 A | 12/2000 | Okada et al. | |
| 6,182,034 B1 | 1/2001 | Malvar | |
| 6,212,232 B1 | 4/2001 | Reed et al. | |
| 6,223,162 B1 | 4/2001 | Chen et al. | |
| 6,240,380 B1 | 5/2001 | Malvar | |
| 6,243,497 B1 | 6/2001 | Chiang et al. | |
| 6,249,614 B1 | 6/2001 | Bocharova et al. | |
| 6,256,422 B1 | 7/2001 | Mitchell et al. | |
| 6,256,423 B1 | 7/2001 | Krishnamurthy | |
| 6,263,022 B1 | 7/2001 | Chen et al. | |
| 6,263,024 B1 | 7/2001 | Matsumoto | |
| 6,275,614 B1 | 8/2001 | Krishnamurthy et al. | |
| 6,278,735 B1 | 8/2001 | Mohsenian | |
| 6,292,588 B1 | 9/2001 | Shen et al. | |
| 6,314,208 B1 | 11/2001 | Konstantinides et al. | |
| 6,337,881 B1 | 1/2002 | Chaddha | |
| 6,347,116 B1 | 2/2002 | Haskell et al. | |
| 6,348,945 B1 | 2/2002 | Hayakawa | |
| 6,356,709 B1 | 3/2002 | Abe et al. | |
| 6,359,928 B1 | 3/2002 | Wang et al. | |
| 6,360,017 B1 | 3/2002 | Chiu et al. | |
| 6,370,502 B1 | 4/2002 | Wu et al. | |
| 6,393,155 B1 | 5/2002 | Bright et al. | |
| 6,408,026 B1 * | 6/2002 | Tao | 375/240.03 |
| 6,418,166 B1 | 7/2002 | Wu et al. | |
| 6,438,167 B1 | 8/2002 | Shimizu et al. | |
| 6,456,744 B1 | 9/2002 | Lafe | |
| 6,463,100 B1 | 10/2002 | Cho et al. | |
| 6,466,620 B1 | 10/2002 | Lee | |
| 6,473,534 B1 | 10/2002 | Merhav et al. | |
| 6,490,319 B1 | 12/2002 | Yang | |
| 6,493,385 B1 | 12/2002 | Sekiguchi et al. | |
| 6,519,284 B1 | 2/2003 | Pesquet-Popescu et al. | |
| 6,546,049 B1 | 4/2003 | Lee | |
| 6,571,019 B1 | 5/2003 | Kim et al. | |
| 6,593,925 B1 | 7/2003 | Hakura et al. | |
| 6,600,836 B1 | 7/2003 | Thyagarajan et al. | |
| 6,647,152 B2 | 11/2003 | Willis et al. | |
| 6,654,417 B1 | 11/2003 | Hui | |
| 6,678,422 B1 | 1/2004 | Sharma et al. | |
| 6,687,294 B2 * | 2/2004 | Yan et al. | 375/240.03 |
| 6,704,718 B2 | 3/2004 | Burges et al. | |
| 6,721,359 B1 | 4/2004 | Bist et al. | |
| 6,728,317 B1 | 4/2004 | Demos | |
| 6,731,811 B1 | 5/2004 | Rose | |
| 6,738,423 B1 | 5/2004 | Lainema et al. | |
| 6,759,999 B1 | 7/2004 | Doyen | |
| 6,760,482 B1 | 7/2004 | Taubman | |
| 6,765,962 B1 | 7/2004 | Lee et al. | |
| 6,771,830 B2 | 8/2004 | Goldstein et al. | |
| 6,785,331 B1 | 8/2004 | Jozawa et al. | |
| 6,788,740 B1 | 9/2004 | Van der Schaar et al. | |
| 6,792,157 B1 | 9/2004 | Koshi et al. | |
| 6,795,584 B2 | 9/2004 | Karczewicz et al. | |
| 6,801,572 B2 | 10/2004 | Yamada et al. | |
| 6,807,317 B2 | 10/2004 | Mathew et al. | |
| 6,810,083 B2 | 10/2004 | Chen et al. | |
| 6,831,947 B2 | 12/2004 | Ribas Corbera | |
| 6,865,291 B1 | 3/2005 | Zador | |
| 6,873,654 B1 | 3/2005 | Rackett | |
| 6,876,703 B2 | 4/2005 | Ismaeil et al. | |
| 6,882,753 B2 | 4/2005 | Chen et al. | |
| 6,909,745 B1 | 6/2005 | Puri et al. | |
| 6,947,045 B1 | 9/2005 | Ostermann et al. | |
| 6,975,680 B2 | 12/2005 | Demos | |
| 6,990,242 B2 | 1/2006 | Malvar | |
| 7,020,204 B2 | 3/2006 | Auvray et al. | |
| 7,027,507 B2 | 4/2006 | Wu | |
| 7,035,473 B1 | 4/2006 | Zeng et al. | |
| 7,042,941 B1 | 5/2006 | Laksono et al. | |
| 7,058,127 B2 | 6/2006 | Lu et al. | |
| 7,099,389 B1 | 8/2006 | Yu et al. | |
| 7,110,455 B2 | 9/2006 | Wu et al. | |
| 7,162,096 B1 | 1/2007 | Horowitz | |
| 7,200,277 B2 * | 4/2007 | Joshi et al. | 382/248 |
| 7,356,085 B2 * | 4/2008 | Gavrilescu et al. | 375/245 |
| 2001/0048718 A1 | 12/2001 | Bruls et al. | |
| 2002/0044602 A1 | 4/2002 | Ohki | |
| 2002/0118884 A1 | 8/2002 | Cho et al. | |
| 2002/0136308 A1 | 9/2002 | Le Maguet et al. | |
| 2002/0154693 A1 | 10/2002 | Demos et al. | |
| 2002/0186890 A1 | 12/2002 | Lee et al. | |
| 2003/0021482 A1 | 1/2003 | Lan et al. | |
| 2003/0053702 A1 | 3/2003 | Hu | |
| 2003/0095599 A1 | 5/2003 | Lee et al. | |
| 2003/0103677 A1 | 6/2003 | Tastl et al. | |
| 2003/0113026 A1 | 6/2003 | Srinivasan et al. | |
| 2003/0128754 A1 | 7/2003 | Akimoto et al. | |
| 2003/0128756 A1 | 7/2003 | Oktem | |

| | | | |
|---|---|---|---|
| 2003/0194010 A1 | 10/2003 | Srinivasan et al. |
| 2003/0215011 A1 | 11/2003 | Wang et al. |
| 2003/0219073 A1 | 11/2003 | Lee et al. |
| 2004/0022316 A1 | 2/2004 | Ueda et al. |
| 2004/0090397 A1 | 5/2004 | Doyen et al. |
| 2004/0190610 A1 | 9/2004 | Song et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053158 A1 | 3/2005 | Regunathan et al. |
| 2005/0094731 A1 | 5/2005 | Xu et al. |
| 2005/0105612 A1 | 5/2005 | Sung et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180502 A1 | 8/2005 | Puri |
| 2005/0207492 A1 | 9/2005 | Pao |
| 2005/0232501 A1 | 10/2005 | Mukerjee |
| 2005/0254719 A1 | 11/2005 | Sullivan |
| 2005/0259729 A1 | 11/2005 | Sun |
| 2006/0013307 A1 | 1/2006 | Olivier et al. |
| 2006/0013309 A1 | 1/2006 | Ha et al. |
| 2006/0071825 A1 | 4/2006 | Demos |
| 2006/0140267 A1 | 6/2006 | He et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0256851 A1 | 11/2006 | Wang et al. |
| 2006/0256867 A1 | 11/2006 | Turaga et al. |
| 2006/0268990 A1 | 11/2006 | Lin et al. |
| 2007/0009039 A1 | 1/2007 | Ryu |
| 2007/0009042 A1 | 1/2007 | Craig et al. |
| 2007/0081588 A1 | 4/2007 | Raveendran et al. |
| 2007/0147497 A1 | 6/2007 | Bao et al. |
| 2007/0201553 A1 | 8/2007 | Shindo |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2008/0240235 A1 | 10/2008 | Holcomb et al. |

FOREIGN PATENT DOCUMENTS

| | | |
|---|---|---|
| EP | 0932306 | 7/1999 |
| EP | 1465349 | 10/2004 |
| EP | 1871113 | 12/2007 |
| GB | 897363 | 5/1962 |
| JP | 2003061090 | 2/2003 |
| JP | 406296275 A * | 10/2004 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2006/075895 | 7/2006 |
| WO | WO 2006/112620 | 10/2006 |
| WO | WO 2007/130580 | 11/2007 |

OTHER PUBLICATIONS

Ahmed et al., "Discrete Cosine Transform," *IEEE Trans. On Computers*, vol. C-23, No. 1, pp. 90-93 (Dec. 1984).

"Embedded Zerotree Wavelet (EZW)," 13 pp.

Farvardin et al., "Optimum quantizer performance for a class of non-Gaussian memoryless sources," *IEEE Trans. Inform. Theory*, vol. IT-30, No. 3, pp. 485-497 (May 1984).

"A Fast Precise Implementation of 8×8 Discrete Cosine Transform Using the Streaming SIMD Extensions and MMX™ Instructions," Version 1.0, 25 pp. (Apr. 1999).

Flierl et al., "A Video Codec Incorporating Block-Based Multi-Hypothesis Motion-Compensated Prediction," in *Proceedings of the SPIE Conference on Visual Communications and image Processing*, Perth, Australia, vol. 4067, pp. 238-249 (Jun. 2000).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," *Proc. SPIE*, vol. 3980, pp. 85-96 (2000).

Garrigues et al., "Atom position coding in a matching pursuit based video coder," *Lecture Notes in Computer Science*, 4 pp. (2005).

Gish et al., "Asymptotically efficient quantizing," *IEEE Trans. Inform. Theory*, vol. IT-14, No. 5 (Sep. 1968).

Impoco, "JPEG2000—a Short Tutorial," 16 pp. (2004).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).

"ISO/IEC 13818-2. Generic coding of moving pictures and associated audio information," MPEG (Moving Pictures Expert Group), International Organization for Standardization, MPEG2 Video (1994).

ISO/IEC, "Information Technology—Coding of Audio-Visual Objects: Visual, ISO/IEC 14496-2, Committee Draft," 330 pp. (1998).

ISO/IEC, "10918-1: CCITT Recommendation T.81: Digital Compression and Coding of Continuous Tone Still Images," pp. 337-547 (1992).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ITU-T, "ITU-T Recommendation T.800: JPEG 2000 Image Coding System: Core Coding System," 212 pp. (2002).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

"JPEG 2000," EEE 508—Lecture 18, 25 pp.

Kim et al., "Still image coding based on vector quantization and fractal approximation," *IEEE Transactions on Image Processing*, vol. 5, No. 4, pp. 587-597 (1996).

Kingsbury, "Use of Laplacian PDFs in Image Compression," 5 pp. (2003).

Lam et al., "A mathematical analysis of the DCT coefficient distributions for images," *IEEE Trans. Image Proc.*, vol. IP-9, No. 10, pp. 1661-1666 (Oct. 2000).

LeGall, "MPEG: A Video Compression Standard for Multimedia Application," *Communications of the ACM*, vol. 34, No. 4, pp. 47-58 (Apr. 1991).

LeGall, "The MPEG Video Compression Algorithm," *Signal Processing: Image Communication 4*, vol. 4, No. 2, pp. 129-140 (Apr. 1992).

LeGall et al., "Transmission of HDTV signals under 140 Mbit/s using a subband decomposition and Discrete Cosine Transform coding," in *Signal Processing of HDTV*, Elsevier, Amsterdam, pp. 287-293 (1988).

Limb, "A Picture-Coding Algorithm for the Merli Scan," *IEEE Transactions on Communications*, pp. 300-305 (Apr. 1973).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Mallat, "A theory for multiresolution signal decomposition: the wavelet representation," *IEEE Trans. Pattern Anal. And Machine Intell.*, vol. PAMI-11, No. 7, pp. 674-692 (Jul. 1989).

Marcellin et al., "An Overview of JPEG-2000," IEEE Data Compression Conference, 19 pp. (2000).

Marshall, "The Discrete Cosine Transform," 4 pp. (document dated Oct. 4, 2001) [downloaded from the World Wide Web on Mar. 30, 2006].

Martinez-Fonte et al., "An Empirical Study on Corner Detection to Extract Buildings in Very High Resolution Satellite Images," *IEEE-ProRisc*, Veldhoven, The Netherlands, pp. 288-293 (Nov. 2004).

Masala et al., "Perceptually Optimized MPEG Compression of Synthetic Video Sequences," *Proc. ICIP*, pp. I-601-1-604 (2005).

Max, "Quantizing for minimum distortion," *IEEE Trans. Inform. Theory*, vol. IT-6, No. 1, pp. 7-12 (Mar. 1960).

Mitra et al., "Two-Stage Color Palettization for Error Diffusion," *Proceedings of SPIE*, pp. 207-217 (Jun. 2002).

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. On Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reininger et al., "Distribution of two-dimensional DCT coefficients for images," *IEEE Trans. On Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Santa Cruz et al., "An Analytical Study of JPEG 2000 Functionalities" / "JPEG 2000 Still Image Coding Versus Other Standards," Proc. SPIE vol. 4115, 10 pp. (2000).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shanableh et al., "Heterogeneous Video Transcoding to Lower Spatio-Temporal Resolutions and Different Encoding Formats," *IEEE Transactions on Multimedia*, vol. 2, No. 2, pp. 101-110 (Jun. 2000).

Shen et al., "Rate-Distortion Optimization for Fast Hierarchical B-Picture Transcoding," *IEEE*, pp. 5279-5282 (2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Taubman et al., "Embedded Block Coding in JPEG2000," 4 pp. (2000).

Taubman et al., "JPEG2000: Image Compression Fundamentals, Standards and Practice," pp. 110-113 and 348-353 (2002).

Tescher, "Transform image coding," *Advances in Electronics and Electron. Physics*, Suppl. 12, Academic Press, New York, pp. 113-115 (1979).

Tsang et al., "Fuzzy Based Rate Control for Real-Time MPEG Video," *IEEE Transactions on Fuzzy Systems*, pp. 504-516 (1998).

Wien, "Variable Block-Size Transforms for Hybrid Video Coding," Dissertation, 182 pp. (Feb. 2004).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (1998).

Zaid et al., "Wavelet Image Coding with Adaptive Thresholding," 4 pp. (2002).

Zhang et al., "Adaptive Field/Frame Selection for High Compression Coding," *SPIE Conf. on Image and Video Communications and Processing*, 13 pp. (Jan. 2003).

De Simone, et al., "A comparative study of JPEG 2000, AVC/H.264, and HD Photo," SPIE Optics and Photonics, Applications of Digital Image Processing XXX, 12 pp. (Aug. 2007).

Golner et al., "Region Based Variable Quantization for JPEG Image Compression," *IEEE Symp. on Circuits and Systems*, pp. 604-607 (Aug. 2000).

ISO/IEC, "14496-2: Information Technology—Coding of Audio-Visual Objects—Part 2: Visual," 724 pp. (Jun. 2004).

Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).

Lei et al., "Rate Adaptation Transcoding for Precoded Video Streams," 13 pp. (2000).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Sullivan, "On Embedded Scalar Quantization," *IEEE*, pp. 605-608 (May 2004).

Wang, et al., "A Framework for Adaptive Scalable Video Coding Using Wyner-Ziv Techniques," *EURASIP Journal on Applied Signal Processing*, pp. 1-18 (month unknown, 2006).

Xiong et al., "Wavelet Packet Image Coding Using Space-Frequency Quantization," *IEEE Transactions on Image Processing*, vol. 7, No. 6, pp. 892-898 (Jun. 1998).

Gavrilescu et al., "Embedded Multiple Description Scalar Quantizers," *IEE Electronics Letters*, vol. 39, No. 13, 12 pp. (Jun. 2003).

\* cited by examiner

Figure 1, Prior Art
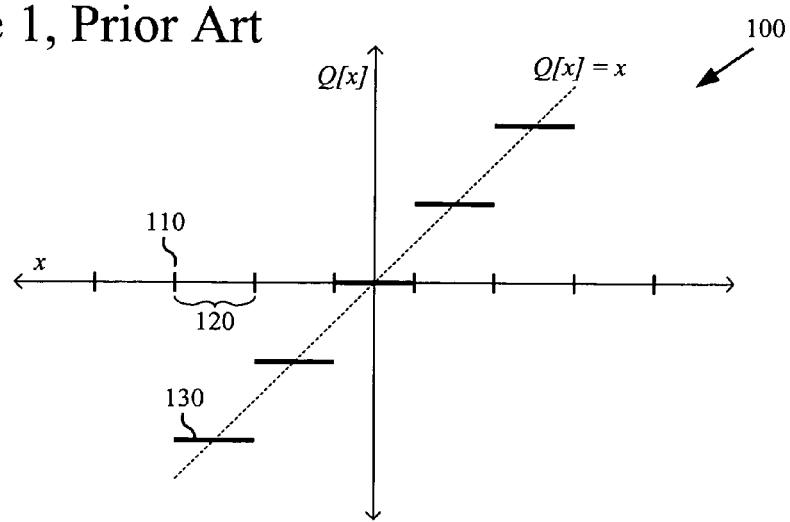
Figure 2a, Prior Art
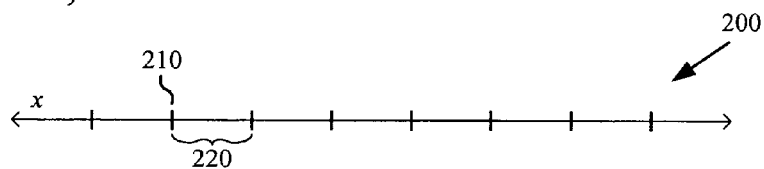
Figure 2b, Prior Art
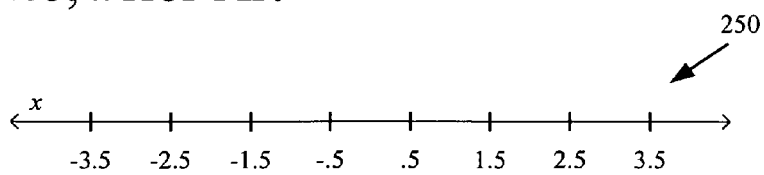

Figure 3, Prior Art
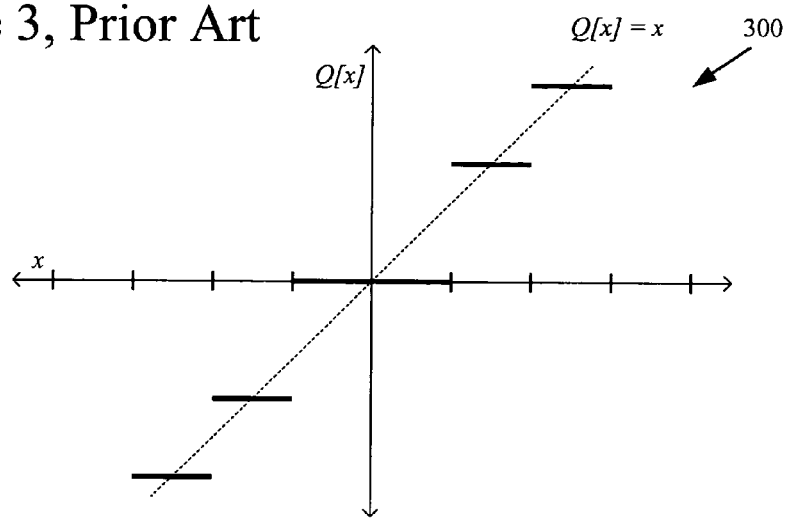
Figure 4a, Prior Art
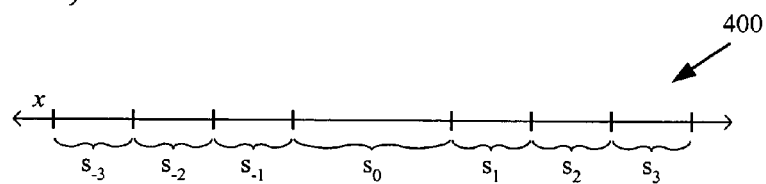
Figure 4b, Prior Art
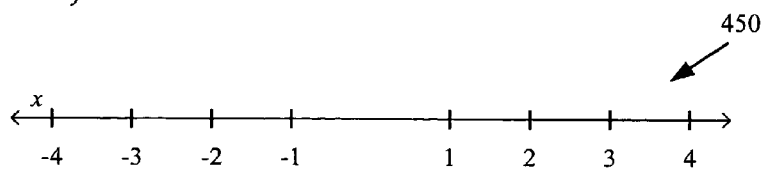

Figure 5, Prior Art
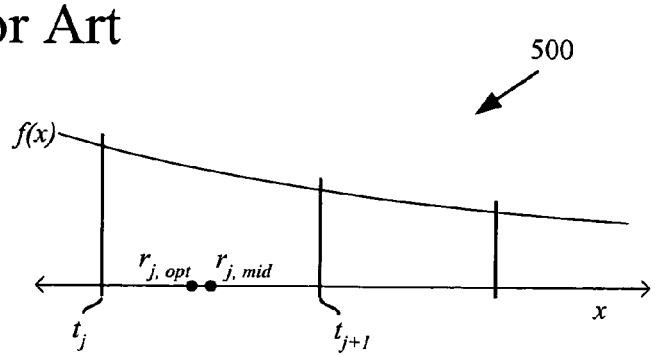
Figure 6, Prior Art
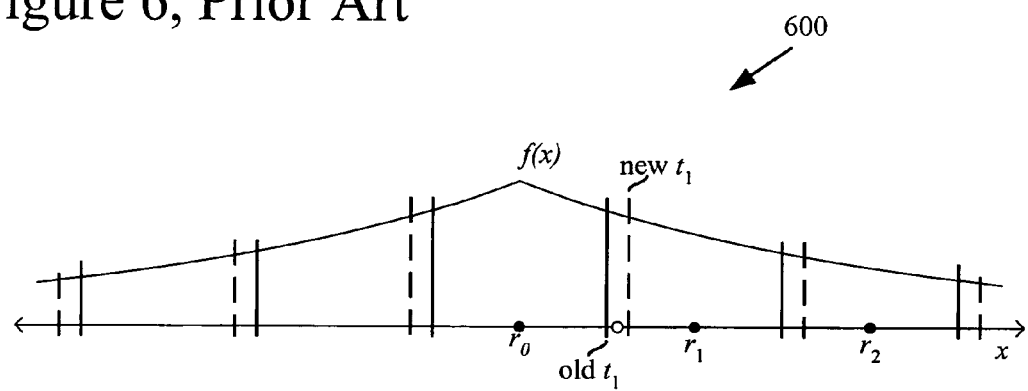

Figure 7, Prior Art
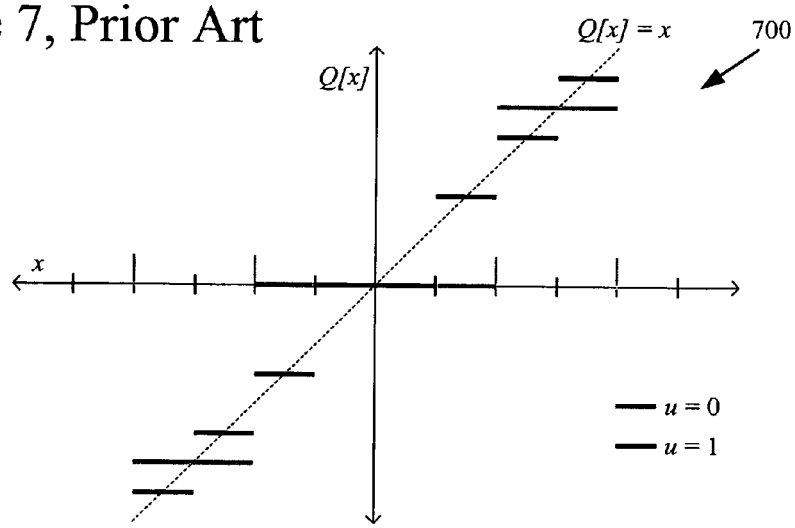
Figure 8, Prior Art
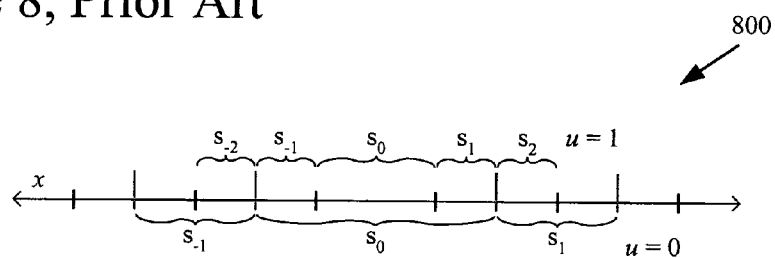

Software 980 implementing rule for embedded scalar quantizer with stable DZ ratio of 1

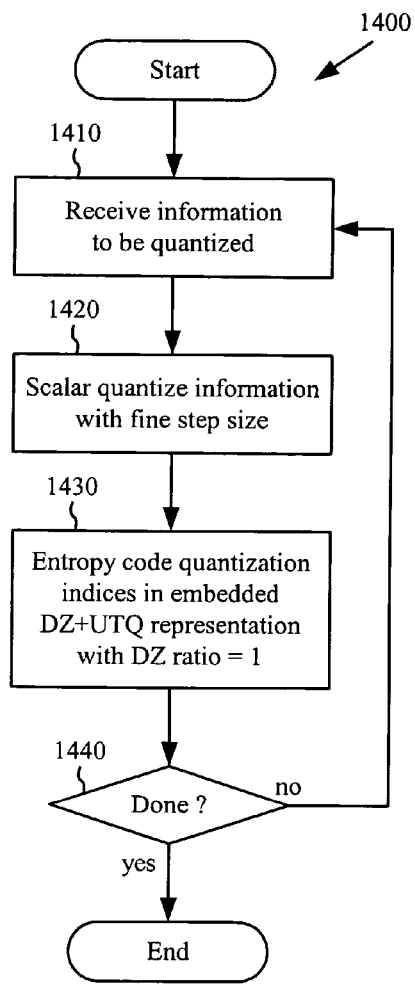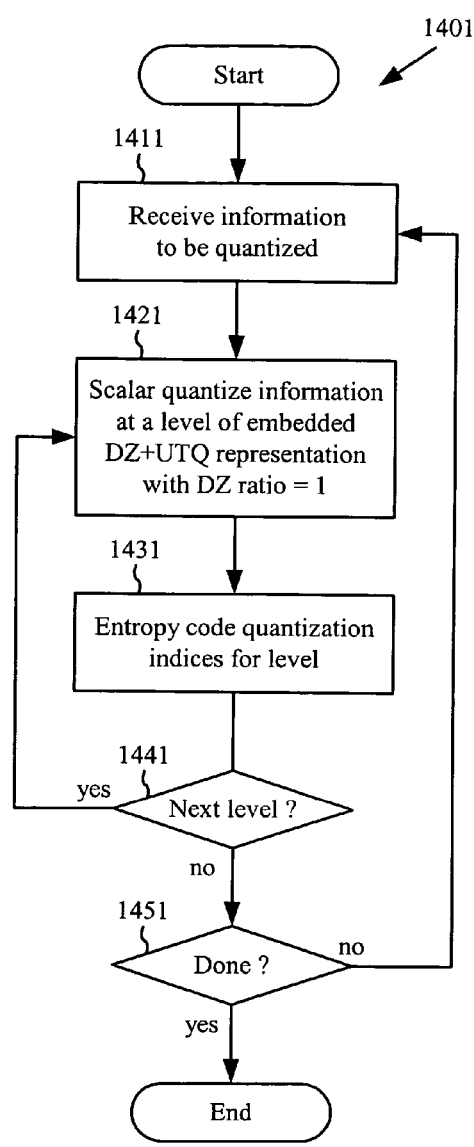

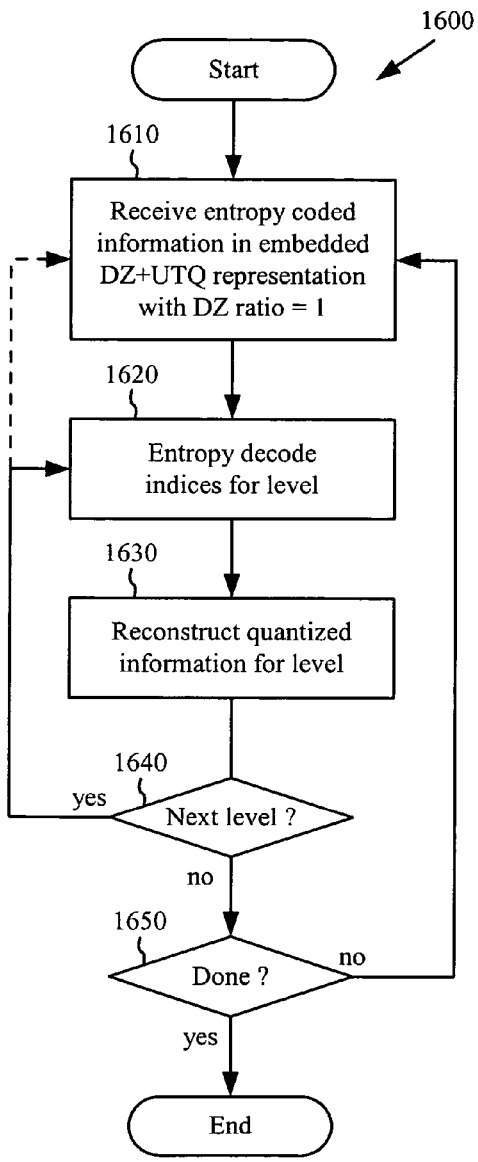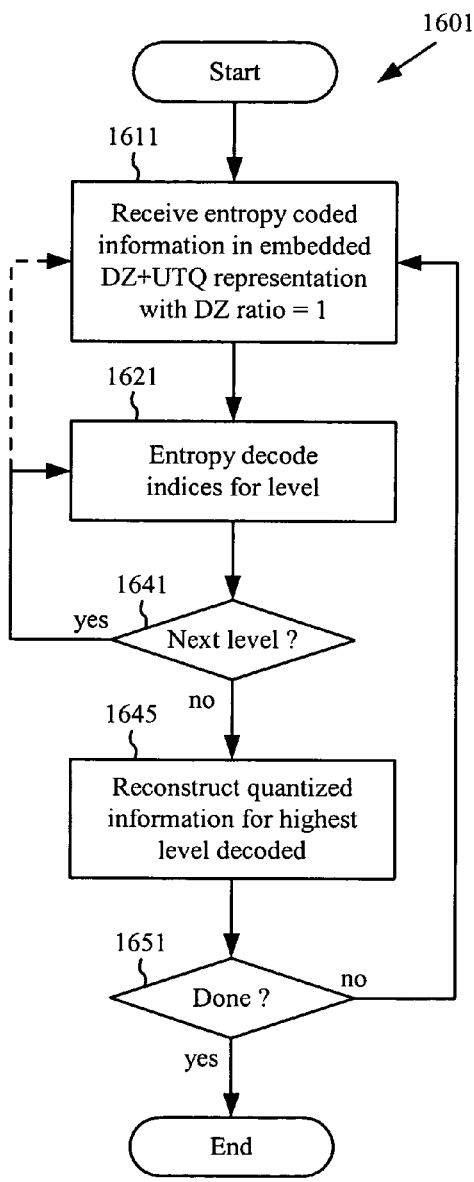

EMBEDDED SCALAR QUANTIZERS WITH ARBITRARY DEAD-ZONE RATIOS

TECHNICAL FIELD

Embedded scalar quantizers for compression are described, along with tools for corresponding decompression. For example, an encoder uses an embedded scalar quantizer with a stable dead-zone ratio of 1.

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Images with higher resolution tend to look crisper than other images and contain more discernable useful details. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width x Height) | Frame Rate (in frames per second) | Bit Rate (in millions of bits per second) |
| --- | --- | --- | --- |
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Decompression (also called decoding) reconstructs a version of the original information from the compressed form. A "codec" is an encoder/decoder system. Two categories of compression are lossless compression and lossy compression.

Lossless compression reduces the bit rate of information by removing redundancy from the information without any reduction in fidelity. For example, a series of ten consecutive pixels that are all exactly the same shade of red could be represented as a code for the particular shade of red and the number ten as a "run length" of consecutive pixels, and this series can be perfectly reconstructed by decompression from the code for the shade of red and the indicated number (ten) of consecutive pixels having that shade of red. Lossless compression techniques reduce bit rate at no cost to quality, but can only reduce bit rate up to a certain point. Decreases in bit rate are limited by the inherent amount of variability in the statistical characterization of the input data, which is referred to as the source entropy. Entropy coding is another term for lossless compression.

In contrast, with lossy compression, the quality suffers somewhat but the achievable decrease in bit rate is more dramatic. For example, a series of ten pixels, each being a slightly different shade of red, can be approximated as ten pixels with exactly the same particular approximate red color. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—in a system design in which the lossy compression establishes an approximation of the information and lossless compression techniques are applied to represent the approximation. For example, the series of ten pixels, each a slightly different shade of red, can be represented as a code for one particular shade of red and the number ten as a run-length of consecutive pixels. In decompression, the original series would then be reconstructed as ten pixels with the same approximated red color.

II. Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers

According to one possible definition, a scalar quantizer is an approximating functional mapping x→Q[x] of an input value x to a quantized value Q[x]. FIG. 1 shows a "staircase" I/O function (100) for a scalar quantizer. The horizontal axis is a number line for a real number input variable x, and the vertical axis indicates the corresponding quantized values Q[x]. The number line is partitioned by thresholds such as the threshold (110). Each value of x within a given range between a pair of adjacent thresholds is assigned the same quantized value Q[x]. For example, each value of x within the range (120) is assigned the same quantized value (130). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 1) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 2a shows a generalized classifier (200) and thresholds for a scalar quantizer. As in FIG. 1, a number line for a real number variable x is segmented by thresholds such as the threshold (210). Each value of x within a given range such as the range (220) is assigned the same quantized value Q[x]. FIG. 2b shows a numerical example of a classifier (250) and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x]=\beta[A[x]] \tag{1}$$

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 1) and therefore Q[Q[x]] will typically be equal to Q[x]. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\overline{D}=E_x\{d(X-Q[X])\}$ is lower for an equal or lower entropy H of A[X]. The most commonly-used distortion measure is the squared error distortion measure, for which $d(|x-y|)=|x-y|^2$. When the squared error distortion measure is used, the expected value of the distortion measure ($\overline{D}$) is referred to as the mean squared error.

B. Dead Zone+Uniform Threshold Quantizers

According to one possible definition, a dead zone plus uniform threshold quantizer ["DZ+UTQ"] is a quantizer with uniformly spaced threshold values for all classifier regions except the one containing the zero input value (which is called the dead zone ["DZ"]). A DZ+UTQ has a classifier index mapping rule x→A[x] that can be expressed based on two parameters. FIG. 3 shows a staircase I/O function (300) for a DZ+UTQ, and FIG. 4a shows a generalized classifier (400) and thresholds for a DZ+UTQ. The parameter s, which is greater than 0, indicates the step size for all steps other than the DZ. Mathematically, all $s_i$ are equal to s for i≠0. The parameter z, which is greater than or equal to 0, indicates the ratio of the DZ size to the size of the other steps. Mathematically, $s_0=z\cdot s$. In FIG. 4a, z is 2, so the DZ is twice as wide as the other classification zones. The index mapping rule x→A[x] for a DZ+UTQ can be expressed as:

$$A[x] = \text{sign}(x) * \max\left(0, \left\lfloor \frac{|x|}{s} - \frac{z}{2} + 1 \right\rfloor\right), \tag{2}$$

where $\lfloor \cdot \rfloor$ denotes the smallest integer less than or equal to the argument and where sign(x) is the function defined as:

$$\text{sign}(x) = \begin{cases} +1, & \text{for } x \geq 0, \\ -1, & \text{for } x < 0. \end{cases} \tag{3}$$

FIG. 4b shows a numerical example of a classifier (450) and thresholds for a DZ+UTQ with s=1 and z=2. FIGS. 1, 2a, and 2b show a special case DZ+UTQ with z=1. Quantizers of the UTQ form have good performance for a variety of statistical sources. In particular, the DZ+UTQ form is optimal for the statistical random variable source known as the Laplacian source.

In some system designs (not shown), an additional consideration may be necessary to fully characterize a DZ+UTQ classification rule. For practical reasons there may be a need to limit the range of values that can result from the classification function A[x] to some reasonable finite range. This limitation is referred to as clipping. For example, in some such systems the classification rule could more precisely be defined as:

$$A[x] = \text{sign}(x) * \min\left[g, \max\left(0, \left\lfloor \frac{|x|}{s} - \frac{z}{2} + 1 \right\rfloor\right)\right], \tag{4}$$

where g is a limit on the absolute value of A[x]. In much of the theoretical analysis presented herein, consideration of clipping is omitted as it unduly complicates the analysis without advancing the explanation. Moreover, although the clipping shown in the above example is symmetric about zero, the clipping does not need to be symmetric, and often is not exactly symmetric. For example, a common clipping range would be such that the value of A[x] is limited to some range from $-2^B$ to $+2^B-1$ so that A[x] can be represented as an integer using a two's complement representation that uses B+1 bits, where B+1 may be equal to 8 or 16 or another particular selected number of bits.

C. Reconstruction Rules Different reconstruction rules may be used to determine the reconstruction value for each quantization index. These include the optimal reconstruction rule and the single offset reconstruction rule (of which the mid-point reconstruction rule is an example). FIG. 5 shows reconstruction points according to different reconstruction rules for a particular shape of a source probability distribution function ƒ(x). For a range of values between two thresholds $t_j$ and $t_{j+1}$, the reconstruction value $r_{j,mid}$ according to the mid-point reconstruction rule bisects the range (thus, $r_{j,mid}=(t_j+t_{j+1})/2$). For the example probability distribution function shown in FIG. 5, this fails to account for the fact that values to the left of the mid-point are more likely than values to the right of the mid-point. The reconstruction value $r_{j,opt}$ according to the optimal reconstruction rule accounts for the probability distribution.

In general, a probability distribution function ["pdf"] indicates the probabilities for the different values of a variable.

One possible definition of the optimal reconstruction value $r_{j,opt}$ for each region between two neighboring thresholds $t_j$ and $t_{j+1}$ for a pdf $f(x)$ can be expressed as:

$$r_{j,opt} = \min_y{}^{-1} \int_{t_j}^{t_{j+1}} d(x-y)f(x)dx. \qquad (5)$$

Assuming that the pdf $f(x)$ for a given source is symmetric around zero, one possible definition of the optimal reconstruction rule of a DZ+UTQ for a symmetric, difference-based distortion measure $d(|x-y|)$ is:

$$\beta[k] = \begin{cases} \min_y{}^{-1} \int_0^{\frac{zs}{2}} [d(|x-y|)+d(|y-x|)]f(x)dx, & \text{for } k=0, \\ \text{sign}(k)\min_y{}^{-1} \int_{\frac{zs}{2}+(|k|-1)s}^{\frac{zs}{2}+|k|s} d(|x-y|)f(x)dx, & \text{for } k \neq 0. \end{cases} \qquad (6)$$

where y is the quantized value Q[x], and where the rule finds the quantized value Q[x] that results in the smallest distortion according to the distortion measure. Typically, the optimal quantized value for $\beta[0]$ is equal to 0, and that will be assumed to be true for the remainder of this description. For minimizing mean squared error, the optimal reconstruction rule sets the reconstruction value for each region equal to the conditional mean of the input values in that region. Stated more precisely, the optimal reconstruction value $r_{j,opt}$ for the region between two neighboring thresholds $t_j$ and $t_{j+1}$ for a pdf $f(x)$ when using the mean squared error distortion measure is given by $$r_{j,opt} = \frac{\int_{t_j}^{t_{j+1}} x \cdot f(x)dx}{\int_{t_j}^{t_{j+1}} f(x)dx}. \qquad (7)$$

According to one possible definition for a DZ+UTQ, the single-offset reconstruction rule is based on an offset parameter $\Delta$, where ordinarily $0 < \Delta \leq s/2$, and the rule is:

$$\beta[k] = \begin{cases} 0, & \text{for } k=0, \\ \text{sign}(k)\left[\left(|k|+\frac{z}{2}-1\right)s + \Delta\right], & \text{for } k \neq 0. \end{cases} \qquad (8)$$

The mid-point reconstruction rule is a special case of the single-offset reconstruction rule, specified by $\Delta = s/2$. Mid-point reconstruction is commonly used for convenience due to its simplicity. And, in the limit as s becomes very small, the performance of the mid-point rule becomes optimal under a variety of well-behaved mathematical conditions.

D. Specifying Reconstruction Values, Constructing Classifiers

Standards and product specifications that focus only on achieving interoperability will often specify reconstruction values without necessarily specifying the classification rule. In other words, some specifications may define the functional mapping $k \rightarrow \beta[k]$ without defining the functional mapping $x \rightarrow A[x]$. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal. FIG. 6 shows such adjusted thresholds for a classifier (600). The original thresholds (such as old $t_j$) are situated halfway between the reconstruction points. The thresholds are moved outward on the number line, away from 0. Before the adjustment, a marginal value (shown between the old $t_j$ and the new $t_j$) is mapped to $r_j$. After the adjustment, the marginal value is mapped to $r_0$. The decoder performs reconstruction without knowledge of the adjustments done in the encoder.

For optimal encoding, an encoder may adjust quantization thresholds to optimally fit a given set of reconstruction values as follows. The probability $p_j$ for the source random variable X to fall within a range j between $t_j$ and $t_{j+1}$ (where $t_{j+1} > t_j$) for a source pdf $f(x)$ is:

$$p_j = \int_{t_j}^{t_{j+1}} f(x)dx, \qquad (9)$$

and the number of bits necessary to represent an event with probability $p_j$ in an ideal lossless communication system may be quantified as:

$$h_j = \log_2 \frac{1}{p_j}, \qquad (10)$$

where the $h_j$ is expressed in terms of bits. The total entropy of the classifier is then given by $$H = \sum_j p_j \cdot h_j \text{ bits.} \qquad (11)$$

In general, if the encoder is required to use $b_j$ bits to indicate the selection of the reconstruction value $r_j$, the encoder may evaluate and optimize its thresholds according to minimization of the rate-distortion relation $D+\lambda R$, where D indicates distortion, R indicates bit usage, and $\lambda$ is a tuning parameter for favoring a particular selected balance between distortion and bit rate. For each particular threshold $t_{j+1}$ between two points $r_j$ and $r_{j+1}$, the encoder can set $t_{j+1}$ to the x that satisfies:

$$d(x-r_j)+\lambda b_j = d(x-r_{j+1})+\lambda b_{j+1} \qquad (12).$$

In an ideal design, $b_j$ will be approximately equal to $h_j$, and modern lossless coding techniques can be used to very nearly achieve this goal. In a design using some non-ideal lossless coding technique to represent the output of the classifier, $b_j$ may have some other value.

Note in summation that optimal decision thresholds can be selected using equation (12), that optimal reconstruction values can be selected using equation (5) or (7), and that optimal bit usage can be computed by setting $b_j$ equal to $h_j$ as given by equation (10) or to the number of bits used in some other lossless code (such as a Huffman code designed using equation (9) or a fixed-length code). In some highly-optimized scalar quantizer system designs, reconstruction values (initially uniformly spaced) are analyzed to adjust thresholds in encoder analysis, then use of the adjusted thresholds is analyzed to set the number of bits needed to represent the output of the classifier using lossless coding and to set the reconstruction values in decoder analysis. The new reconstruction values are then analyzed to adjust thresholds, and so on, until the thresholds and/or reconstruction values stabilize across iterations.

E. Embedded Scalar Quantizers

With embedded scalar quantization, the representation of source information is refined with successively finer quantizers formed by further segmenting the steps of coarser quantizers. Embedded scalar quantizers are commonly used for compression applications for various kinds of media, including video, still images, and audio. According to one possible definition, an embedded quantizer (also known as a progressive quantizer) for a DZ+UTQ is an indexed sequence of quantizer mappings $\{Q_u[\bullet], \text{ for } u=0, \ldots \}$, such that as u increases, each quantization index mapping function $x \rightarrow A_u[x]$ is formed by segmenting some or all of the regions associated with the function of the preceding level: $x \rightarrow A_{u-1}[x]$. FIG. 7 shows a staircase I/O function (700) for two levels of an embedded DZ+UTQ. The ranges for the lowest level (u=0, shown in gray) are segmented into ranges for the next higher level (u=1, shown in black). This allows more precise quantization at the higher level (u=1).

FIG. 8 shows a classifier (800) and thresholds for an embedded DZ+UTQ. The DZ ratio for the lowest level (u=0) is 2. All $s_i$ are equal in value for $i \neq 0$, such that $s_i = S$ for $i \neq 0$, and $s_0 = 2 \cdot s$. For the next higher level (u=1), the non-DZ regions are split in half. The DZ is this example is split into three regions, where the center region (the new DZ) has double the width of the other regions. At the higher level (u=1) all regions are half the size of the corresponding regions from the lower level (u=0), yet the DZ ratio is still 2. For example, if the width of the DZ at a level is 12 q, the width of each other zone is 6 q at that level. For the next higher level, each 6 q zone is split into two 3 q zones, and the 12 q DZ is split into a 3 q zone, 6 q DZ, and other 3 q zone. Thus, at the higher level, the DZ ratio is still 2.

Embedded quantizers can enable a functionality known as bitstream scalability. When using an embedded quantizer design, the representation of the source information can be encoded and sent separately for different quantization levels. For example, information for a coarse representation (quantization indices for a coarse level) is sent, followed by information for a finer representation (indices for refinements), followed by information for an even finer representation (indices for further refinements), etc. In each stage, the expected quantity of information is the difference in entropy $H_u - H_{i-1}$ of the mapping functions for the two stages. Bit rate scalability can add somewhat to the computational complexity of the operation of the system, but can enable useful capabilities such as the delivery of different degrees of quality to different decoders from a single encoded representation, or such as the application of increased protection against the loss of the first, lower stages of the representation of the data. Therefore, embedded scalar quantizers are being considered for more and more applications as the desire for bit rate scalability has increased and as the effectiveness of bit rate scalable methods has improved.

IV. Standards and Products

Numerous international standards specify aspects of video decoders and formats for compressed video information. These standards include the H.261, MPEG-1, H.262, H.263, MPEG-4, and H.264/AVC/JVT standards. Directly or by implication, these standards also specify certain encoder details, but other encoder details are not specified. Aside from video standards, standards such as those in the JPEG family address still image compression/decompression, and other standards address audio compression/decompression. Numerous companies have produced encoders and decoders for audio, still images, and video. Various other kinds of signals (for example, hyperspectral imagery, graphics, text, financial information, etc.) are also commonly represented and stored or transmitted using compression techniques.

The above-mentioned standards do not fully specify the quantizer design. Each allows some variation in the encoder classification rule $x \rightarrow A[x]$ and/or the decoder reconstruction rule $k \rightarrow \beta[k]$. In some cases, parts of these rules are not specified in the standard at all. In other cases, the method does not represent good practice. For example, JPEG-1992 provides an embedded reconstruction rule that is effectively a single-offset rule in which $\Delta$ does not change with u. Since the offset $\Delta$ does not change even as the widths of the regions shrink, this is a rather poor rule approaching or exceeding 6 dB of sub-optimality at some rates if the number of levels u becomes large.

The use of a DZ ratio z=2 or greater has been implicit in a number of non-embedded encoding designs. For example, the spacing of reconstruction values for predicted regions in the H.261, MPEG-1, H.262, H.263, and MPEG-4 part 2 standards implies use of $z \geq 2$. Reconstruction values in these examples from standards are spaced appropriately for use of DZ+UTQ classification with z=2 and mid-point reconstruction. Altering thresholds to increase optimality for the specified reconstruction values (as described above) results in an even larger DZ ratio (since the DZ requires fewer bits to select than the other levels).

Designs based on z=1 (or at least z<2) are used for: (1) the non-embedded form of JPEG-1992; (2) intra DC coefficients in H.261 and H.263; (3) intra DC and AC coefficients in MPEG-1, H.262 and H.263 Annex I; (4) all intra DC and some intra AC coefficients in the non-embedded form of MPEG-4 part 2; and (5) all coefficients in H.264/AVC. In these cases, reconstruction values are equally spaced around zero and away from zero. Mid-point reconstruction would in this case imply a DZ ratio z=1. Widening the DZ ratio to be greater than 2 for the same reconstruction values would place the non-zero reconstruction values outside of their corresponding classification regions, which would be a very obviously sub-optimal quantizer design (i.e., the line representing the ideal I/O relationship Q[x]=x would not cross through some steps of the staircase diagram).

As for embedded quantization, the MPEG-4 part 2 standard (ISO/IEC 14496-2) describes embedded quantization for still texture objects and fine granularity scalability. The JPEG-1992 and JPEG-2000 standards also describe embedded quantization. In these standards, the embedded quantization is based on a design in which the DZ ratio is equal to 2 (or approximately equal to 2). With the JPEG-2000 standard, for example, the DZ ratio is equal to 2, or it rapidly converges towards 2 at lower levels while using another DZ ratio such as 1 at the highest level. Each non-DZ in a current level is split into two non-DZs in a higher level, and the DZ in the current level is split into a DZ in the higher level with one non-DZ on each side. For additional information about JPEG-2000, see, for example, Taubman et al, *JPEG 2000: Image Compression*

Fundamentals, Standards, and Practice, Sections 3.2.7 and 8.3, other materials written about JPEG-2000, and the JPEG-2000 standard itself. While MPEG-4 part 2, JPEG-1992, and JPEG-2000 thus allow bitstream scalability with embedded quantization, these standards are somewhat inflexible in how non-DZs and DZs are split from level to level. Consequently, these standards fail to provide adequate rate-distortion performance for many applications.

SUMMARY

In summary, various strategies for embedded scalar quantization are described. For example, an encoder uses a classifier rule for an embedded scalar quantizer with a DZ ratio of 1, and a decoder uses a reconstruction rule appropriate for such a quantizer. Compared to previous embedded quantizer designs, this improves compression efficiency. The various strategies can be used in combination or independently.

According to a first strategy, an embedded DZ+UTQ is characterized by integers m and n, where m is greater than or equal to 0, n is greater than or equal to 0, and m is not equal to n. The quantizer includes a rule for processing information in an embedded representation, where the rule may be a classification rule or a reconstruction rule. According to the rule, for each level of one or more levels each of multiple non-DZs in the level splits into m+1 non-DZs in a higher level, and the DZ in the level splits into a DZ and n non-DZs on each side in the higher level. For example, m is 2 and n is 1 for a quantizer with a stable DZ ratio of 1. The quantizer may be used in a still image codec, video codec, or audio codec.

According to a second strategy, a tool such as an encoder or a decoder processes information based at least in part upon a rule associated with an embedded quantizer. Each of plural non-DZs in a current level splits into m+1 non-DZs in a next higher level, where m is greater than 1.

According to a third strategy, a tool such as an encoder or a decoder processes information based at least in part upon a rule associated with an embedded quantizer. A DZ in a current level splits into a DZ and n non-DZs on each side in a next higher level, where n is greater than 1.

According to a fourth strategy, an encoder includes means for processing information according to a classification rule for an embedded scalar quantizer, characterized by (a) splitting of each of multiple non-DZs into m+1 non-DZs and (b) splitting of a DZ into a new DZ and n non-DZs on each side. The value of m is different than the value of n. The encoder also includes means for entropy encoding results of the processing.

According to a fifth strategy, a decoder includes means for entropy decoding information. The decoder also includes means for processing the information according to a reconstruction rule for an embedded scalar quantizer, characterized by (a) splitting of each of plural non-DZs into m+1 non-DZs and (b) splitting of a DZ into a new DZ and n non-DZs on each side. The value of m is different than the value of n.

These and other features and advantages of the invention will be made apparent from the following detailed description of embodiments that proceeds with reference to the accompanying drawings.

BRIEF DESCRIPTION OF THE DRAWINGS

FIG. 1 is a chart showing a staircase I/O function for a scalar quantizer according to the prior art.

FIGS. 2a and 2b are charts showing classifiers and thresholds for scalar quantizers according to the prior art.

FIG. 3 is a chart showing a staircase I/O function for a DZ+UTQ according to the prior art.

FIGS. 4a and 4b are charts showing classifiers and thresholds for DZ+UTQs according to the prior art.

FIG. 5 is a chart showing reconstruction points for different reconstruction rules for a given pdf shape according to the prior art.

FIG. 6 is a chart showing adjustments to a classifier for a scalar quantizer according to the prior art.

FIG. 7 is a chart showing a staircase I/O function for an embedded DZ+UTQ according to the prior art.

FIG. 8 is a chart showing a classifier for an embedded scalar quantizer with a DZ ratio of 2 according to the prior art.

FIGS. 14a and 14b are flowcharts showing techniques for encoding using an embedded scalar quantizer with a DZ ratio of 1.

FIGS. 16a and 16b are flowcharts showing techniques for decoding information encoded using an embedded scalar quantizer with a DZ ratio of 1.

DETAILED DESCRIPTION

Described embodiments are directed to techniques and tools for embedded scalar quantization. With these techniques, a codec improves compression efficiency for quantized information in an embedded representation. In some embodiments, a codec improves quality by up to 1 dB compared to previous embedded quantization designs, which is typically equivalent to a 10% to 20% reduction in bit rate.

In some embodiments, a codec uses an embedded scalar quantizer design that is a DZ+UTQ with repeated division of the interval sizes by specific factors. Some or all of the non-DZ steps at a current level are divided into m+1 non-DZ steps at the next higher level, where m is an integer greater than 0, and the DZ at the current level is divided into a DZ at the next higher level with n new non-DZ steps on each side of the DZ at the higher level, where n is an integer greater than or equal to 0. In some embodiments, the factor m is not equal to 1 or the factor n is not equal to 1. Or, both m and n are not equal to 1. Possible DZ ratios are 0, between 0 and 1, 1, between 1 and 2, 2, or greater than 2.

In some applications, a still image codec quantizes spectral coefficients for blocks of samples. In other applications, a video codec quantizes spectral coefficients for blocks of samples or motion compensation residuals for video. The codecs may be integrated into a variety of devices, including personal computers, digital cameras, game console systems, mobile communication devices, and various media recording or playback devices. In still other applications, a processing tool other than a still image or video encoder or decoder implements one or more of the techniques on video, still images, or some other type of information. For example, the techniques may be applied to spectral coefficients in an audio codec.

While processing techniques are described in places herein as part of a single, integrated system, the techniques can be applied separately, potentially in combination with other techniques. Moreover, although operations for the various techniques are described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

I. Computing Environment

Figure 9:
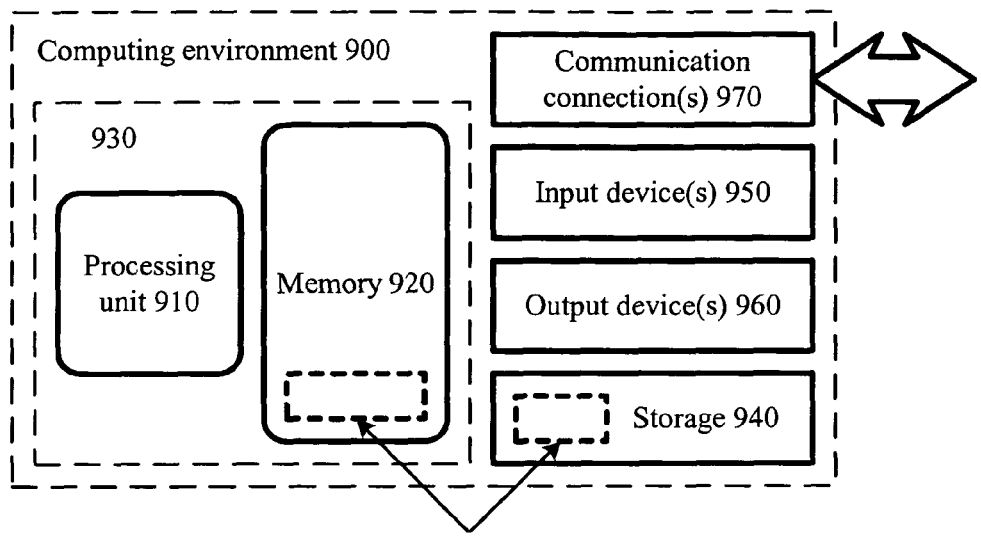
FIG. 9 is a block diagram of a suitable computing environment in which described embodiments may be implemented.

FIG. 9 illustrates a generalized example of a suitable computing environment (900) in which described embodiments may be implemented. The computing environment (900) is not intended to suggest any limitation as to scope of use or functionality, as the techniques and tools may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing an embedded scalar quantization rule as described herein.

A computing environment may have additional features. In FIG. 9, the computing environment (900) includes storage (940), one or more input devices (950), one or more output devices (960), and one or more communication connections (970). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, CD-RWs, DVDs, or any other medium which can be used to store information and which can be accessed within the computing environment (900). The storage (940) stores instructions for the software (980).

The input device(s) (950) may be a touch input device such as a keyboard, mouse, or pen, a voice input device, a scanning device, or another device that provides input to the computing environment (900). For audio, still images, or video, the input device(s) (950) may be a sound card, digital camera interface, video card, TV tuner card, or similar device that accepts audio, image, or video input in analog or digital form, or a CD-ROM or CD-RW that reads audio, image, or video samples into the computing environment (900). The output device(s) (960) may be a display, printer, speaker, CD-writer, or another device that provides output from the computing environment (900).

The communication connection(s) (970) enable communication over a communication medium to another computing entity. The communication medium conveys information such as computer-executable instructions, audio, still image, or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, terms like "apply," "determine," and "adjust" are used herein to describe computer operations in a computing environment. These terms are high-level abstractions for operations performed by a computer, and should not be confused with acts performed by a human being. The actual computer operations corresponding to these terms vary depending on implementation.

II. Generalized Source Encoder and Decoder

Figure 10:
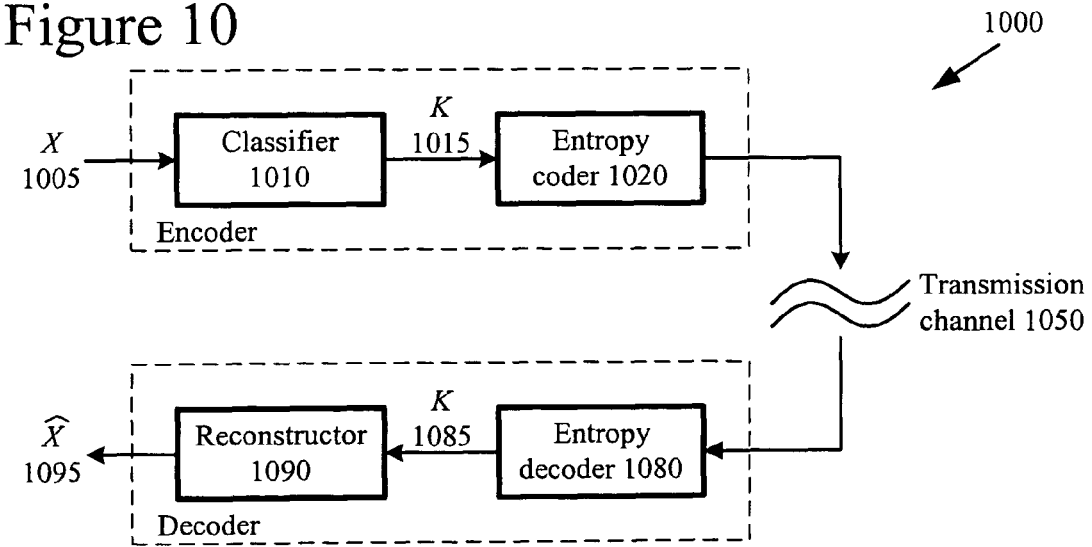
FIG. 10 is a block diagram of a generalized source codec in conjunction with which described embodiments may be implemented.

FIG. 10 shows a generalized source codec (1000) including an encoder and decoder in conjunction with which described embodiments may be implemented. The encoder receives information X (1005) and produces compressed information. The decoder receives the compressed information and produces reconstructed information $\hat{X}$ (1095) (the hat denotes approximation). Particular embodiments of encoders and decoders typically use a variation or supplemented version of the generalized source codec (1000), including, for example, customizations for a particular media type. An example still image codec is described below with reference to FIG. 11. For examples of other still image and video codecs into which described embodiments may be incorporated, see the JPEG and MPEG-4 standards referenced above.

The encoder includes a classifier (1010), which performs embedded scalar quantization. The classifier (1010) maps real number (here, floating point), integer, or other inputs to integer-valued quantization indices, or performs some other mapping of a data set to indices. For example, the classifier (1010) quantizes the information X (1005) according to an embedded DZ+UTQ with a stable DZ ratio of 1. In the classifier (1010) or elsewhere, the encoder may incorporate a weighting matrix so that the input of the quantizer is scaled appropriately to fit the design of the quantizer, where the weighting matrix can be used in combination with scalar quantization.

The classifier (1010) is followed by an entropy coder (1020), which entropy codes the output of the classifier (1010). Typical entropy coding techniques include arithmetic coding, Huffman coding, run length and run level coding, LZ coding, dictionary coding, and combinations of the above. In particular, arithmetic coding or other efficient adaptive encoding techniques facilitate effective embedded quantization. The entropy coder (1020) can use different coding techniques for different kinds of information, and can choose from among multiple code tables within a particular coding technique. The entropy coding may occur after quantization finishes or concurrently with quantization.

The encoder transmits the encoded output over a channel (1050) such as a network connection for a local or wide area network. The channel may be lossless (i.e., guaranteed bandwidth, free of noise), have variable bandwidth and/or latency, or have other characteristics. Of course, encoded output may instead be delivered to a decoder by physical delivery (e.g., on CD-ROM, DVD) or another mechanism.

The decoder receives the encoded information, and an entropy decoder (1080) decodes the encoded information using entropy decoding that corresponds to the entropy encoding used in the encoder. Typical entropy decoding techniques include arithmetic decoding, Huffman decoding, run length and run level decoding, LZ decoding, dictionary decoding, and combinations of the above. In particular, arithmetic decoding or other efficient adaptive decoding techniques facilitate effective embedded quantization. The entropy decoder (1080) may use different decoding techniques for different kinds of information, and can choose from among multiple code tables within a particular decoding technique. The entropy decoding may finish before reconstruction starts or occur concurrently with reconstruction.

The entropy decoder (1080) is followed by a reconstructor (1090), which applies a reconstruction rule for an embedded scalar quantizer. The reconstructor (1090) maps integer-valued quantization indices to real number (here, floating point), integer, or other reconstruction values, or performs some other mapping of indices to reconstructed values. For example, the reconstructor (1090) reconstructs information quantized with an embedded DZ+UTQ design with a stable DZ ratio of 1. In the reconstructor (1090) or elsewhere, the decoder may incorporate a weighting matrix so that the output of the quantizer is scaled appropriately for use, which can be used in combination with the scalar quantization.

The relationships shown between modules within the codec (1000) indicate general flows of information in the encoder and decoder; other relationships are not shown for the sake of simplicity. In particular, FIG. 10 does not show side information indicating the encoder settings, modes, tables, etc. used for various layers of the bitstream, etc. Such side information is sent in the output bitstream, often after entropy encoding of the side information. Depending on implementation, the type of compression desired, and/or media type, modules of the encoder or decoder can be added, omitted, split into multiple modules, combined with other modules, and/or replaced with like modules. In alternative embodiments, encoders or decoders with different modules and/or other configurations of modules perform one or more of the described techniques.

III. Image Encoder and Decoder

Figure 11:
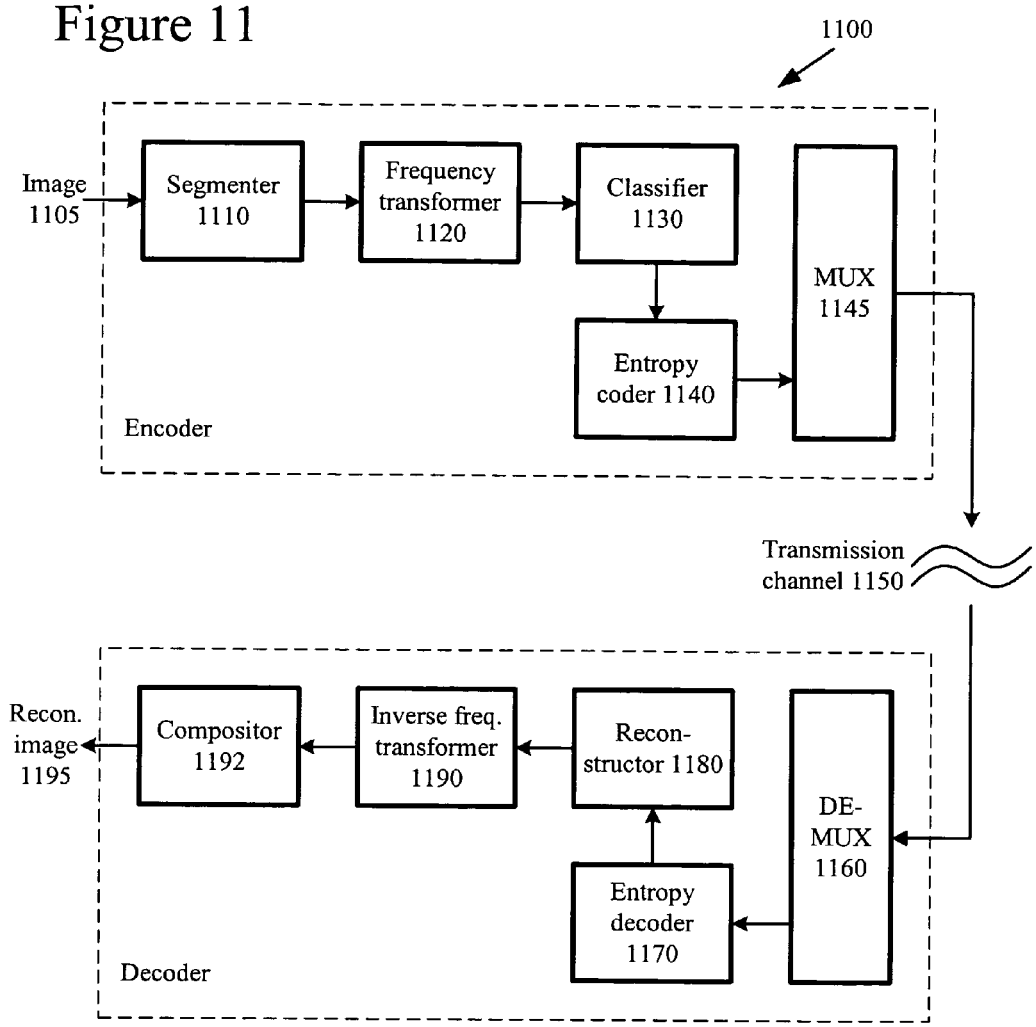
FIG. 11 is a block diagram of a still image codec in conjunction with which described embodiments may be implemented.

FIG. 11 shows a still image codec (1100) including an encoder and decoder in conjunction with which described embodiments may be implemented. The encoder receives an image (1105) and produces compressed image information as output. The decoder receives the compressed image information and produces a reconstructed image (1195). Particular embodiments of still image encoders and decoders typically use a variation or supplemented version of the still image codec (1100).

The encoder includes a segmenter (1110) for partitioning the image (1105) into blocks for subsequent processing. The blocks may be 8×8 blocks or other size blocks, and the segmenter (1110) may pad values at image boundaries to make regular size blocks. For some types of frequency transforms, the segmenter (1110) is omitted.

The frequency transformer (1120) converts the spatial domain still image information into frequency domain (i.e., spectral) information. For example, the frequency transformer (1120) applies a discrete cosine transform ["DCT"], variant of DCT, or other block transform to the blocks of image information, producing blocks of frequency transform coefficients. Alternatively, the frequency transformer (1120) applies another conventional frequency transform such as a Fourier transform or uses wavelet or subband analysis. The frequency transformer (1120) may apply an 8×8, 8×4, 4×8, 4×4 or other size frequency transform.

A classifier (1130) then quantizes the blocks of spectral coefficients. For example, the classifier (1130) applies a classification rule for an embedded DZ+UTQ with a stable DZ ratio of 1. The classifier (1130) produces quantized spectral coefficients as well as side information such as quantization step sizes.

An entropy coder (1140) entropy codes the output of the classifier (1130) using an entropy encoding technique such as one listed above with reference to FIG. 10. As noted above, arithmetic coding or other efficient adaptive encoding techniques facilitate effective embedded quantization. The entropy encoder (1140) may also encode side information such as quantization step sizes (not shown).

The entropy coder (1140) provides compressed image information to the multiplexer ["MUX"] (1145). The MUX (1145) may include a buffer, and a buffer level indicator may be fed back to bit rate adaptive modules for rate control. Before or after the MUX (1145), the compressed image information can be channel coded for delivery over the channel (1150) or processed for delivery by another mechanism. The MUX (1145) may receive and output other information such as compressed audio along with the compressed image information.

In the decoder, a demultiplexer ["DEMUX"] (1160) receives the compressed image information and makes the received information available to the entropy decoder (1170) and other modules of the decoder. The DEMUX (1160) may include a jitter buffer and other buffers as well. Before or after the DEMUX (1160), the compressed image information can be channel decoded.

The entropy decoder (1170) decodes the encoded spectral information using entropy decoding that corresponds to the entropy encoding used in the encoder. The entropy decoder (1170) may also decode side information such as quantization step sizes (not shown).

The entropy decoder (1170) is followed by a reconstructor (1180). The reconstructor (1180) reconstructs the quantized information using a reconstruction rule, for example, for an embedded DZ+UTQ design with a stable DZ ratio of 1.

An inverse frequency transformer (1190) converts the reconstructed frequency domain information into spatial domain image information. For example, the inverse frequency transformer (1190) applies an inverse DCT ["IDCT"], variant of IDCT, or other inverse block transform to blocks of the frequency transform coefficients, producing sample information for a still image. Alternatively, the inverse frequency transformer (1190) applies another conventional inverse frequency transform such as an inverse Fourier transform or uses wavelet or subband synthesis. The inverse frequency transformer (1190) may apply an 8×8, 8×4, 4×8, 4×4, or other size inverse frequency transform.

The compositor (1192) receives the blocks of reconstructed spatial domain image information from the inverse frequency transformer (1190) and puts the blocks together into the reconstructed image (1195), in effect undoing the partitioning performed by the segmenter (1110). The decoder may apply a deblocking filter or other filter to the reconstructed image (1195) to smooth artifacts such as discontinuities at block boundaries.

The relationships shown between modules within the image codec (1100) indicate general flows of information in the encoder and decoder; other relationships are not shown for the sake of simplicity. In particular, FIG. 11 does not show side information indicating the encoder settings, modes, tables, etc. used for various layers of the bitstream, etc. Such side information is sent in the output bitstream, often after entropy encoding of the side information. Also not shown in FIG. 11 is the use of prediction techniques such as prediction of some transform coefficient values to reduce the magnitude of the data to be quantized and entropy coded. Also not shown in FIG. 11 is the use of a weighting matrix to adjust the coarseness of the quantization individually for each particular frequency of transform coefficient to be quantized. (Such a weighting matrix can provide a perceptual benefit in such a system by adjusting the coarseness of the quantization to the frequency-dependent sensitivity of the human visual system.) Depending on implementation and/or the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

IV. Typical Probability Distributions

The embedded scalar quantizers described herein may be used to compress source information having a variety of different pdfs. Results are presented below for Laplacian and Gaussian pdfs. The generalized Gaussian source pdf is:

$$f_{GG}(x) = \frac{v}{2\Gamma(1/v)} \left[\frac{\eta(v)}{\sigma}\right] \exp\left\{-\left[\frac{\eta(v)}{\sigma}|x|\right]^v\right\}, \tag{13}$$

where $\sigma>0$ is the standard deviation, $v>0$ is a shape parameter, and:

$$\eta(v) = \sqrt{\Gamma(3/v)/\Gamma(1/v)} \tag{14},$$

where $\Gamma(\ )$ is the mathematical function known as the (complete) gamma function, which can be expressed in integral form for an argument $a>0$ as:

$$\Gamma(a) = \int_0^\infty x^{a-1} e^{-x} dx \tag{15}.$$

The Laplacian and Gaussian pdfs are special cases of the generalized Gaussian pdf with $v=1$ and $v=2$, respectively. Generalized Gaussian pdfs with v in the range of 0.5 to 2 have frequently been used as models for compression applications, particularly for transform-based image and video compression applications. It is common, for example, to use the Laplacian source ($v=1$) to model values of non-DC transform coefficients, and to use the Gaussian source ($v=2$) to model values of DC coefficients.

For the Laplacian source, the quantizer performance can be computed analytically. The Laplacian source pdf is given by $$f_L(x) = \frac{1}{\sigma\sqrt{2}} e^{-|x|\sqrt{2}/\sigma}. \tag{16}$$

Defining $\alpha=s\sqrt{2}/\sigma$, DZ+UTQ entropy HL (when g is sufficiently large) is:

$$H_L = B(e^{-z\alpha/2}) + e^{-z\alpha,2}[1+B(e^{-\alpha})/(1-e^{-\alpha})] \text{ bits} \tag{17},$$

where the function B(p) for $0<p<1$ is:

$$B(p) = -p \log_2(p) - (1-p) \log_2(1-p) \tag{18},$$

and where the expected distortion for single-offset reconstruction (when g is sufficiently large) is:

$$D_L = \frac{\sigma^2}{2}[\gamma(z\alpha/2, 0) + \gamma(\alpha, \delta)e^{-z\alpha/2}/(1-e^{-\alpha})], \tag{19}$$

where $$\gamma(a, b) = \int_0^a d(|x-b|)e^{-x} dx, \tag{20}$$

and $\delta=\Delta\sqrt{2}/\sigma$. For the squared-error distortion measure, $$\gamma(a,b) = (b^2-2b+2)(1-e^{-a}) - ae^{-a}(a-2b+2) \tag{21},$$

and the optimal reconstruction rule is a single-offset rule with:

$$\delta = 1 - \alpha e^{-\alpha}/(1-e^{-\alpha}) \tag{22}.$$

For mid-point reconstruction, $\delta=\alpha/2$. The value of $\delta$ for optimal reconstruction approaches $\alpha/2$ as s (and therefore $\alpha$) approaches zero, confirming that mid-point reconstruction is asymptotically optimal when s is small.

V. Embedded Scalar Quantizers with Arbitrary DZ Ratios

In some embodiments, codecs use improved embedded scalar quantization techniques. These techniques can provide dramatic performance improvements over prior techniques. For example, an encoder or decoder as in FIG. 10 or 11 uses one or more of the techniques. Alternatively, another tool implements one or more of the techniques.

A. Theory and Examples

This section analyzes embedded DZ+UTQs. As simplifying assumptions, the quantizers have a large (effectively infinite) number of steps (e.g., g is assumed to be large) and differences due to rounding operations performed as implementation details to approximate the ideal equations are ignored in relations. In fact, more typical and practical applications involve embedded scalar quantizers with limited numbers of steps (e.g., g would not be infinite in a practical system). For example, a quantizer may use 64, 128, or 256 steps for spectral coefficient values. Rounding may lead to small differences in ratios and factors, depending on implementation. It is shown that any rational number can be maintained as a stable DZ ratio, but two forms of embedded scalar quantizers are investigated in depth—quantizers with DZ ratios of 1 and 2.

Suppose $Q_{u-1}[\bullet]$ and $Q_u[\bullet]$ are DZ+UTQs, where $Q_{u-1}[\bullet]$ is for a coarser level and $Q_u[\bullet]$ is for a finer level. Each non-DZ step of $Q_{u-1}[\bullet]$ is divided into non-DZ steps of $Q_u[\bullet]$. There is some integer $m_u \geq 0$ such that:

$$s_u = s_{u-1}/(m_u+1) \tag{23}.$$

The DZ of $Q_{u-1}[\cdot]$ is divided into a DZ for $Q_u[\cdot]$ plus zero or more steps to each side of the new DZ. There is some integer $n_u$ such that $0 \leq n_u \leq (m_u+1)z_{u-1}/2$ for which:

$$z_{u-1}s_{u-1} - 2n_u s_u = z_u s_u \quad (24)$$

Thus, $2 n_u$ is the number of steps on the sides of a new DZ that lie within the prior DZ. With some simple substitution, solving equation (24) for $z_u - 1$, results in:

$$z_{u-1} = (z_u + 2n_u)/(m_u + 1) \quad (25).$$

The DZ ratio for a quantizer is stable between two levels u and u−1 if $z_u = z_{u-1}$ (ignoring rounding errors). Solving equation (25) for a stable DZ ratio $\hat{z}$ (the hat here denotes stability) results in the following relation between $\hat{z}$, m, and n:

$$\hat{z} = 2n/m \quad (26).$$

Using the same $m>0$ and $n \geq 0$ for every level allows a stable DZ ratio of $\hat{z}$ for all $u \geq 0$, provided that $z_0$ is equal to $\hat{z}$. Moreover, equation (26) shows that any rational number can be achieved as a stable DZ ratio by appropriate selection of m and n. This counters the common misconception that $\hat{z}=2$ (with m and n equal to 1) is the only possible stable DZ ratio. In fact, an infinite number of stable alternatives exist.

Even if a DZ ratio is not perfectly stable from level to level, it converges towards a stable value if m and n are held constant from level to level. Starting with any DZ ratio $z_u$, if the value of $m_u>0$ and $n_u \geq 0$ are held constant for multiple values of u, the result of $j \geq 0$ iterations of equation (25) is the relationship:

$$z_{u-j} = \hat{z} + (z_u - \hat{z})/(m+1)^j \quad (27).$$

When the same values of m and n are used across levels, regardless of the DZ ratio $z_u$ used at some high bit rate, the DZ ratio rapidly approaches $\hat{z}$ as j is increased (since the denominator $(m+1)^j$ increases exponentially, eventually dwarfing the numerator and pushing the fractional component towards 0). At the earlier, lower bit rate stages of the embedded quantization design (where u−j is 0 or close to 0), the DZ ratio approaches $\hat{z}$. Thus, the DZ ratio can differ substantially from $\hat{z}$ only in the final, high bit rate refinement levels of the operation.

In practice, designs using small values of m are likely to be of interest for most applications, as these provide finer granularity in scalability between consecutive levels. Moreover, relatively small values of n appear to be useful in most cases, since large DZ ratios are difficult to justify in rate-distortion terms for most sources. The cases $\hat{z}=2$ (with m=1 and n=1) and $\hat{z}=1$ (with m=2 and n=1) are therefore of primary interest. The case with z=0, sometimes called a mid-rise quantizer, is not considered due to its inability to produce bit rates below 1 bit per sample.

Figure 12:
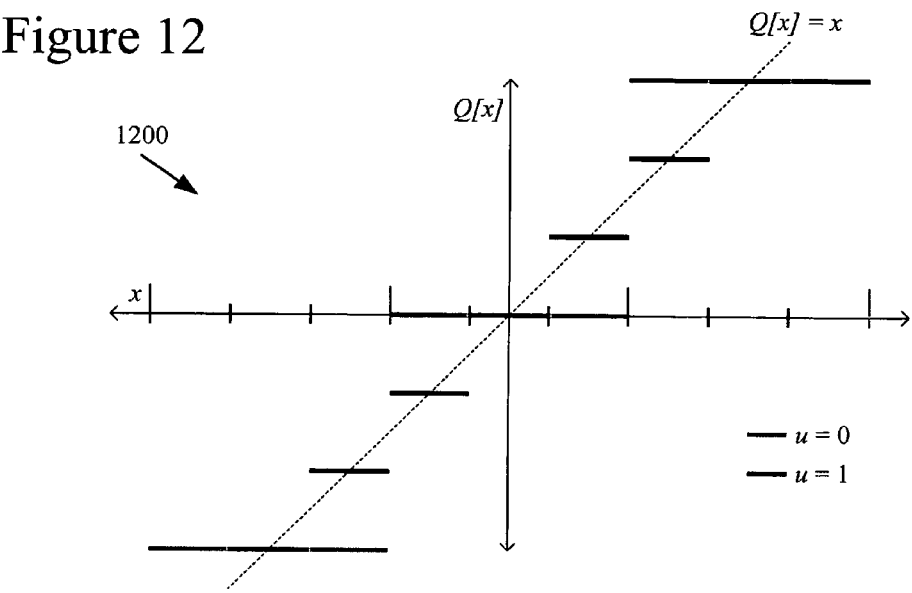
FIG. 12 is a chart showing a staircase I/O function for an embedded scalar quantizer with a stable DZ ratio of 1.
Figure 13:
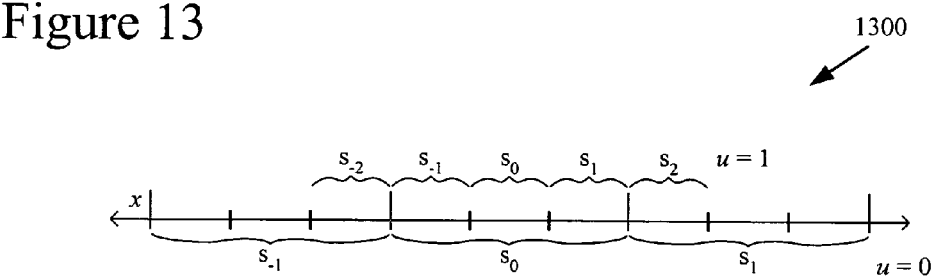
FIG. 13 is a chart showing a classifier for an embedded scalar quantizer with a stable DZ ratio of 1.

FIGS. 7 and 8 illustrate an embedded DZ+UTQ where $\hat{z}=2$, n=1, and m=1, as found in several prior international standards including the JPEG standards. Using a different DZ ratio provides better performance in some applications. FIGS. 12 and 13 illustrate an embedded DZ+UTQ where $\hat{z}=1$, n=1, and m=2. Specifically, FIG. 12 shows a staircase I/O function (1200) for two levels, and FIG. 13 shows a classifier (1300) and thresholds. With these values for m, n, and $\hat{z}$, each step at a given level is split into three steps for the next higher level, and the value of z stays the same from level to level. For example, if the width of the DZ at a level is 12 q, the width of each other zone at that level is 12 q. For the next higher level, each 12 q zone is split into three 4 q zones, and the 12 q DZ is split into a 4 q zone, a 4 q DZ, and another 4 q zone. Thus, at the higher level, the DZ ratio is still 1.

Non-integer values of $\hat{z}$ are also possible. For example, for m=3, n=2, and $\hat{z}=4/3$, if the width of the DZ at a level is 16 q, the width of each other zone at the level is 12 q. For the next higher level, each 12 q zone is split into four 3 q zones, and the 16 q DZ is split into two 3 q zones, a 4 q DZ, and two more 3 q zones, and z is still 4/3.

B. Encoding Techniques

FIGS. 14a and 14b show techniques (1400, 1401) for encoding information using an embedded scalar quantizer with a DZ ratio of 1. A tool such as an encoder shown in FIG. 10 or 11 performs one of the techniques (1400, 1401). Alternatively, another tool performs one of the techniques (1400, 1401). FIGS. 14a and 14b differ in the timing of the embedded quantization/encoding.

With reference to FIG. 14a, the tool receives (1410) information to be quantized. For example, the information is spectral coefficients for a block of samples of a still image, a block of samples of a video picture, a block of motion compensation residual information for a video picture, or a frame of audio samples. Alternatively, the tool receives some other kind of information.

The tool scalar quantizes (1420) the information using a fine quantization step size. For example, the tool uses the smallest step size. The tool relies on subsequent processing to separate the quantization indices into an embedded representation.

After the scalar quantization, the tool entropy codes (1430) quantization indices in an embedded DZ+UTQ representation with a DZ ratio of 1 (e.g., m=2, n=1, z=1). For example, the tool replaces the fine quantized indices with quantization indices at different embedded levels and codes the indices at the respective levels using an adaptive arithmetic coder. The tool may incorporate signaling for significant values and insignificant values, like the JPEG 2000 standard. Alternatively, the tool uses different entropy encoding and/or signaling. The settings may have other values, for example, (a) m=1, n=2, $\hat{z}=4$; (b) m=2, n=3, $\hat{z}=3$; (c) m=3, n=2, $\hat{z}=4/3$; (d) m=3, n=1, $\hat{z}=2/3$; (e) m=2, n=2, $\hat{z}=2$; and so on.

Figure 15:
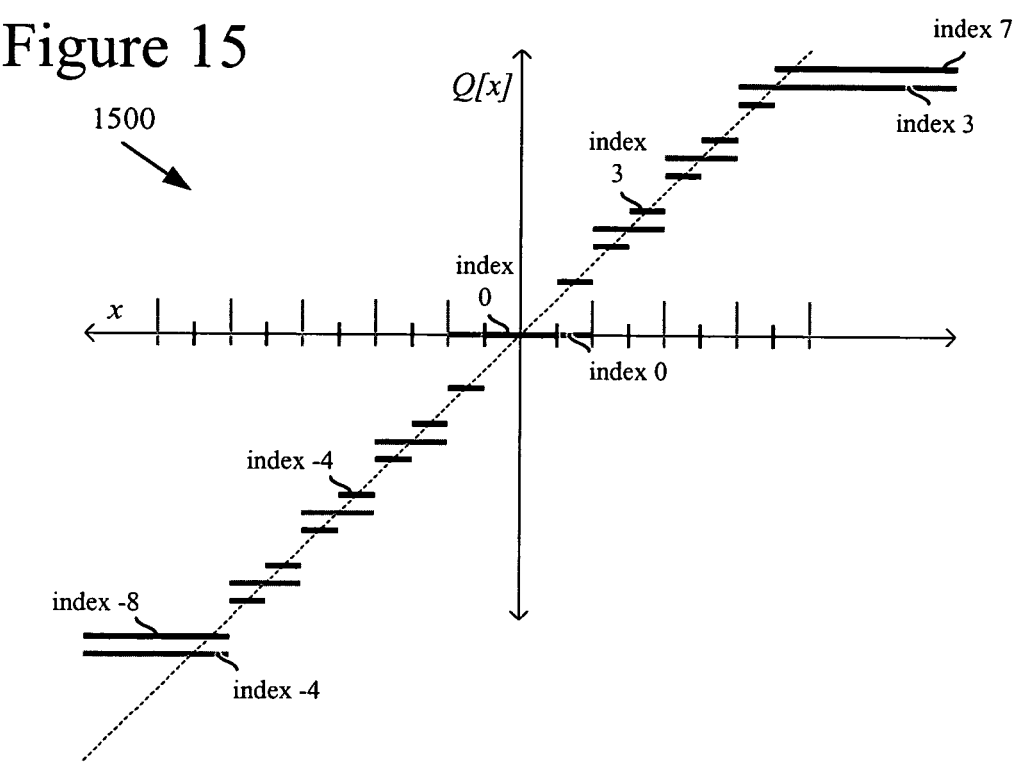
FIG. 15 is a chart showing clipping of classification regions for an embedded scalar quantizer.

When clipping is used, neither or one or both of the non-DZs for the two clipping regions (the regions into which the output of the classifier is clipped for extreme values at the positive and negative ends of the input range) may be split into more than one non-DZ in a higher level. For example, when m=1 and n=1 and clipping is performed so that the output of the classifier $A_u[x]$ for a first level u is required to lie within the bounds of a two's complement representation using B+1 bits (i.e., with $A_u[x]$ ranging from $-2^B$ to $2^B-1$). Clipping for the next level is performed so that the output of the classifier $A_{u+1}[x]$ for the next level u+1 is required to lie within the bounds of a two's complement representation using B+2 bits (i.e., with $A_u[x]$ ranging from $-2^{(B+1)}$ to $2^{(B+1)}-1$), and the region into which negative input values are clipped is not split while the region into which positive input values are clipped is split. FIG. 15 illustrates clipping for a scenario in which m=1, n=1, and B=2. As usual, ranges that map to particular indices at a level u are mapped to more refined indices at the next level u+1. Clipping of the range to $[-2^{(B+1)}, 2^{(B+1)}-1]$ means that the positive clipping level on the right is split while the negative clipping level on the left is not split. In most practical applications, the range of values is greater, with B of up to 8 or 16.

The tool then determines (1440) whether the encoding is done and, if so, finishes. If not, the tool repeats the technique (1400), starting with receiving (1410) the next information to be quantized.

With reference to FIG. 14b, the tool receives (1411) information to be quantized, as in the technique (1400) of FIG. 14a. The tool scalar quantizes (1421) the information at a level of an embedded DZ+UTQ representation with a DZ ratio of 1. In this way, the tool represents the information as quantization indices at different levels for subsequent entropy encoding. Alternatively, the DZ ratio has some other value, as listed above.

The tool entropy codes (1431) the quantization indices for the level. For example, the tool codes the quantization indices at the level using an adaptive arithmetic coder. The tool may incorporate signaling for significant values and insignificant values, like the JPEG 2000 standard. Alternatively, the tool uses different entropy encoding and/or signaling. When clipping is used, neither or one or both of the non-DZ clipping regions may be split into more than one non-DZ in a higher level, as described above.

The tool determines (1441) whether to proceed with encoding at the next level. For example, the tool considers bit rate criteria and/or whether any levels remain. For a next level, the tool continues by scalar quantizing (1421) the information at the next level. After finishing with the different levels for the information, the tool determines (1451) whether the encoding is done and, if so, finishes. If not, the tool repeats the technique (1401), starting from receiving (1411) the next information to be quantized.

C. Decoding Techniques

FIGS. 16a and 16b show techniques (1600, 1601) for decoding information encoded using an embedded scalar quantizer with a DZ ratio of 1. A tool such as a decoder shown in FIG. 10 or 11 performs one of the techniques (1600, 1601). Alternatively, another tool performs one of the techniques (1600, 1601).

FIGS. 16a and 16b differ in the timing of the decoding and reconstruction operations. In some scenarios, it may be beneficial to perform reconstruction (and an inverse transform, etc.) repeatedly as each new level of refinement is received, for example, to gradually build-up a high quality picture as more bits are received over a slow communication link. FIG. 16a addresses such scenarios.

In other scenarios, it may be preferable to gather up all the information first and reconstruct only once, for the highest level of quantization stage for which information was received and decoded. This allows the tool to use the scalability feature of the embedded quantization to decode from a subset of the original encoded content or to otherwise control the total number of bits used. FIG. 16b addresses such scenarios.

With reference to FIG. 16a, the tool receives (1610) entropy coded information in an embedded DZ+UTQ representation with a DZ ratio of 1. Alternatively, the DZ ratio has some other value, as listed above. The tool may receive coded information for all quantization levels before proceeding. Or, the tool may progressively and concurrently receive, decode, and reconstruct information for different quantization levels.

The tool entropy decodes (1620) the quantization indices for an embedded level. For example, the tool decodes the quantization indices at the level using an adaptive arithmetic decoder. The tool may incorporate additional parsing and decoding for signaling of significant values and insignificant values, like the JPEG 2000 standard. Alternatively, the tool uses different entropy decoding and/or parsing.

After the entropy decoding (1620), the tool reconstructs (1630) the quantized information for the level. The reconstructed information for the level is subsequently combined with reconstructed information from other levels.

The tool determines (1640) whether to proceed with decoding at the next level. For example, the tool considers complexity criteria, resource criteria, and/or whether any levels remain. For a next level, the tool continues by entropy decoding (1620) indices for the next level (after receiving (1610) information for the level if necessary). After finishing with the different levels for the information, the tool determines (1650) whether decoding is done and, if so, finishes. If not, the tool repeats the technique (1600), starting by receiving (1610) the next information to be reconstructed.

With reference to FIG. 16b, the tool receives (1611) entropy coded information in an embedded DZ+UTQ representation with a DZ ratio of 1, as in the technique (1600) of FIG. 16a. The tool entropy decodes (1621) the quantization indices for an embedded level, again as in the technique (1600) of FIG. 16a.

After the entropy decoding (1621), the tool determines (1641) whether to proceed with decoding at the next level. For example, the tool considers complexity criteria, resource criteria, and/or whether any levels remain. For a next level, the tool continues by entropy decoding (1621) indices for the next level (after receiving (1611) information for the level if necessary).

After finishing with the decoding for the different levels for the information in the embedded DZ+UTQ representation, the tool reconstructs (1645) the quantized information at the highest level that has been received and decoded. As FIG. 16b shows, the decoder need not reconstruct quantized information at every stage and incrementally refine the reconstructed information.

The tool then determines (1651) whether decoding is done and, if so, finishes. If not, the tool repeats the technique (1601), starting by receiving (1611) the next information to be reconstructed.

VI. Comparisons

In prior embedded quantizers (e.g., in the JPEG standards), doublewide DZs predominate and each embedded refinement stage divides non-DZ steps by two. A DZ ratio of 1 often provides a significant performance advantage (up to 1 dB) over such doublewide DZ quantizers. FIGS. 17a through 17f compare various embedded scalar quantizer designs. The figures show quality differences (in terms of signal to noise ratio ["SNR"] differences) for different DZ ratios, reconstruction rules and pdf shapes. SNR is computed in decibels (dB) as follows:

$$SNR = 10 * \log_{10}(\sigma^2/\overline{D}) \text{ dB} \tag{28},$$

where $\overline{D}$ is mean squared error and $\sigma^2$ is the variance of the source pdf.

Figure 17A:
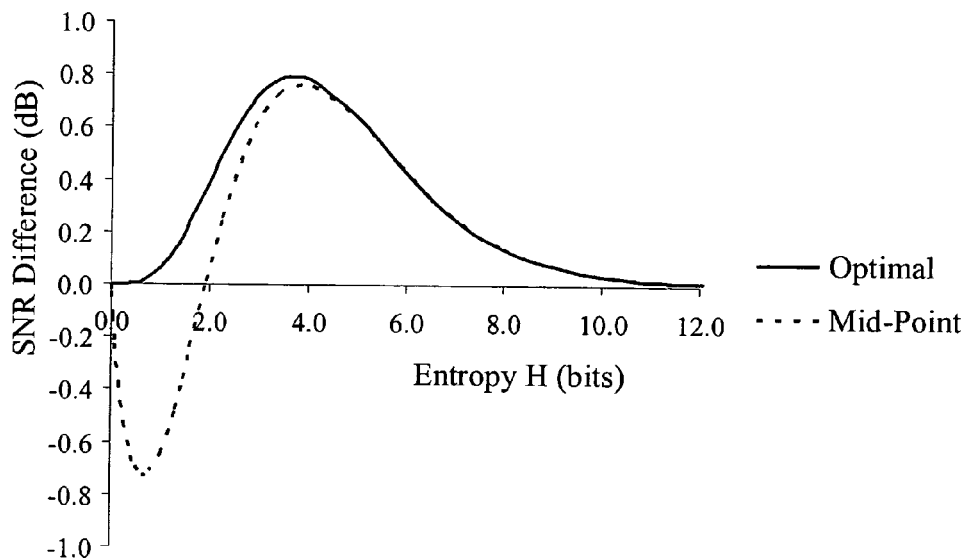
FIGS. 17a through 17f are charts comparing the results of quantization with various embedded scalar quantizers with different DZ ratios.

FIG. 17a charts differences in quality for a DZ+UTQ with $z=1$ over a DZ+UTQ with $z=2$, when using a squared-error distortion measure and a pdf shape with $v=1$. When using optimal reconstruction, $z=1$ always provides equal or better performance than $z=2$. The benefit of $z=1$ over $z=2$ is greatest (0.8 dB) at around four bits per sample for optimal reconstruction. When using mid-point reconstruction, a similar amount of benefit is obtained at four bits per sample and above. There is a range of bit rates at two bits per sample and below, however, for which $z=1$ provides worse performance than $z=2$. This is due to the sub-optimality of mid-point reconstruction for $z=1$ at those bit rates, as shown in FIG. 17b.

Figure 17B:
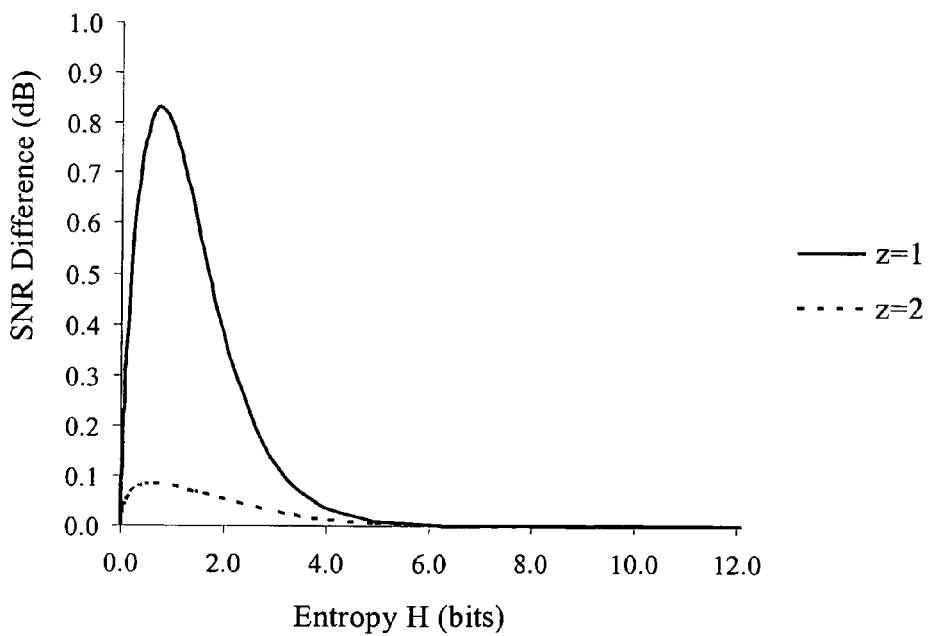

FIG. 17b shows differences in performance for optimal reconstruction over mid-point reconstruction for $z=1$ and $z=2$. For $z=1$, mid-point reconstruction is significantly worse than optimal reconstruction, resulting in a performance difference of as much as 0.83 dB at around 0.75 bits per sample. The penalty diminishes at higher rates for $z=1$. For $z=2$, there is not as much discrepancy between mid-point and optimal reconstruction, with at most a penalty of around 0.08 dB.

Figure 17C:
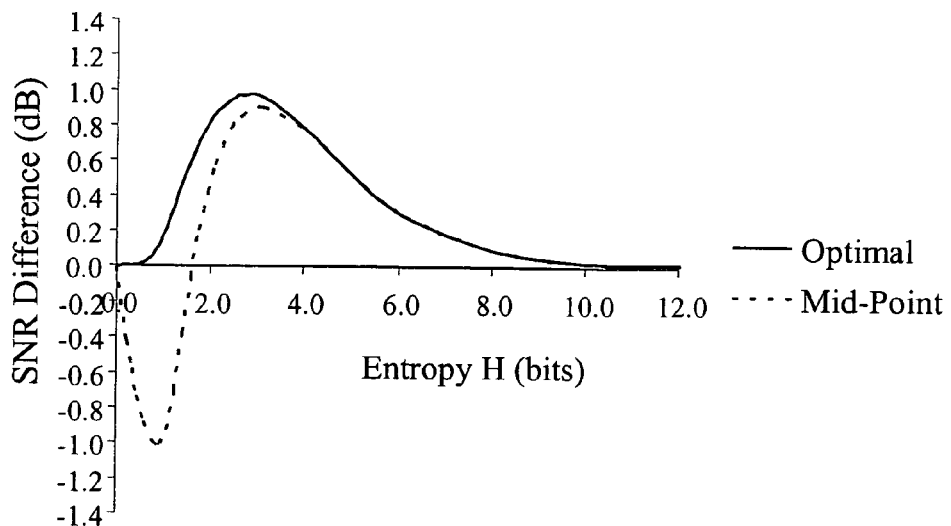
Figure 17D:
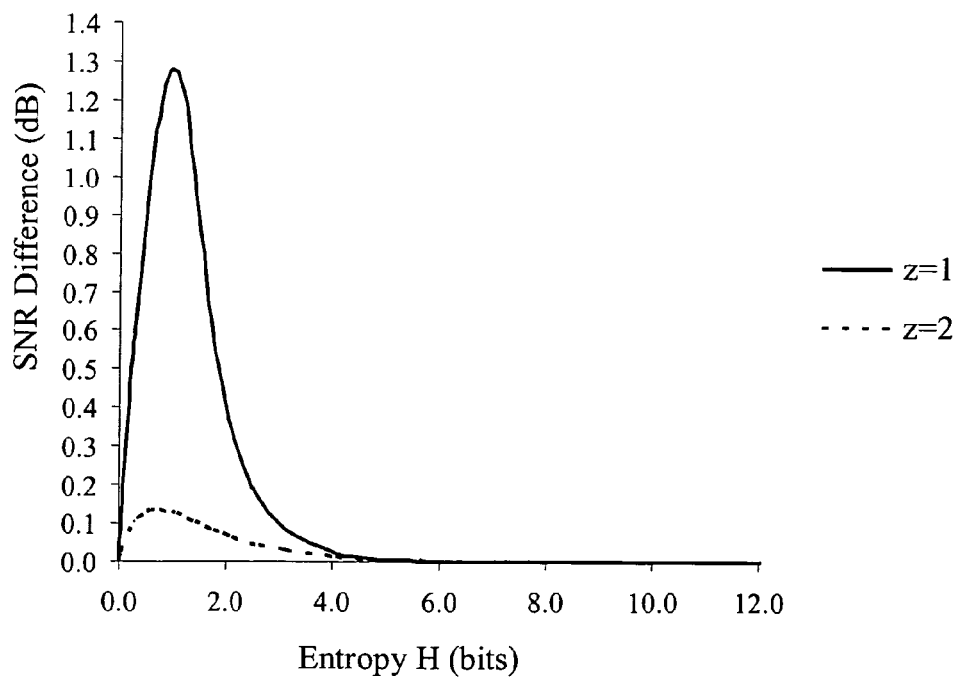

FIGS. 17c and 17d correspond to FIGS. 17a and 17b, respectively, but show results for the Gaussian source ($v=2$).

The patterns of differences are similar for the Gaussian and Laplacian sources, but the magnitude of differences is somewhat greater for the Gaussian source.

Figure 17E:
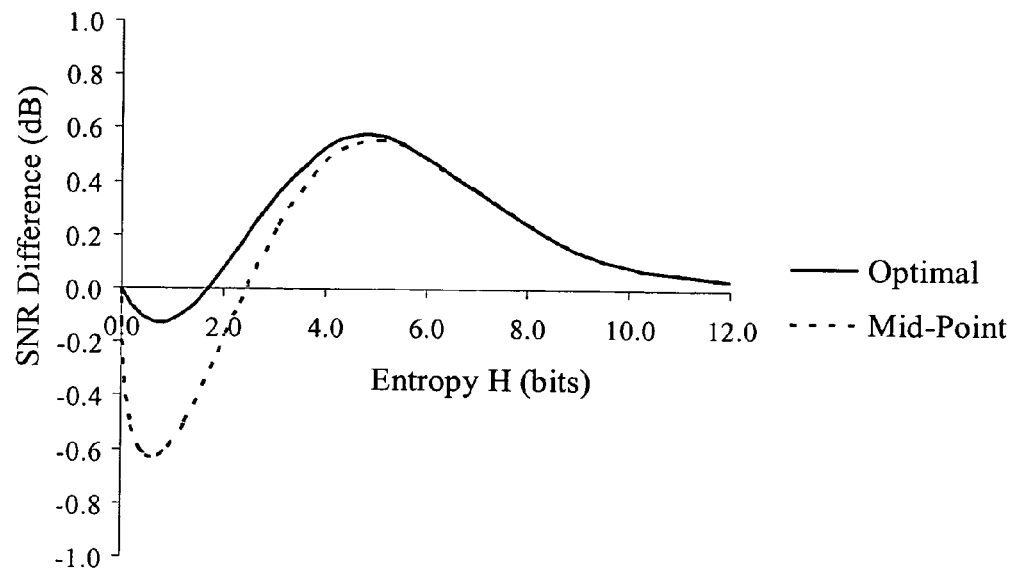
Figure 17F:
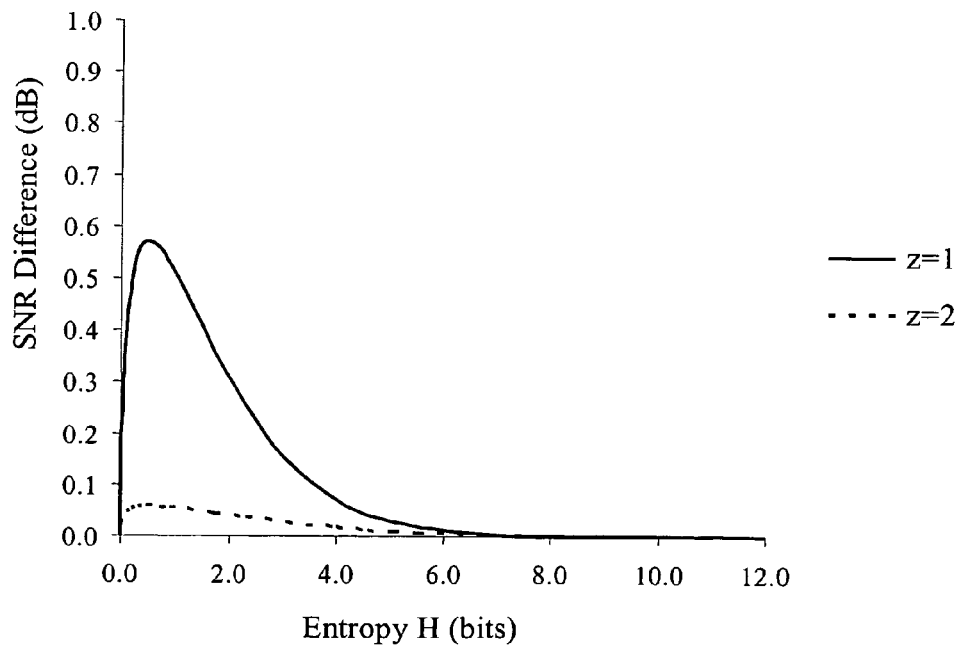

FIGS. 17e and 17f correspond to FIGS. 17a and 17b, respectively, but show results for the generalized Gaussian source with $v=0.5$. When v is 0.5, there is a region with relatively minor performance loss (up to about 0.13 dB) for $z=1$ versus $z=2$ when optimal reconstruction is used. The performance characteristics are otherwise roughly similar in nature for $v=0.5$ and the other two pdf shapes.

In conclusion, various embedded quantizer designs have been described. A significant performance benefit (up to 1 dB) can often be obtained by using a DZ ratio of 1 rather than 2 in an embedded quantizer. This corresponds to a significant bit rate reduction (up to 10%-20%) when quality is held constant. While this degree of improvement in compression efficiency is impressive by itself, it is even more impressive considering it can be attained without significantly increasing the complexity or resource requirements of encoding or decoding.

VII. Alternatives

While the techniques and tools described herein may be implemented as described above, various constraints can be relaxed in direct extensions of the techniques and tools. The following list is indicative of these extensions, but is by no means exhaustive:

(1) Some but not all of the non-DZs for a given level may be split in a higher level, while other non-DZs are not split. This may occur, for example, when clipping is used.

(2) The clipping range may be expanded from stage to stage. For example, when clipping is not symmetric about 0 (as described above for a word length of B+1 bits), the clipping range for positive numbers may grow by one step from stage to stage since $2^{(B+1)}-1$ is $2*(2^B-1)+1$.

Having described and illustrated the principles of my invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. An embedded dead zone plus uniform threshold quantizer executing in memory of a computing system, wherein the quantizer is characterized by integers m and n, wherein m is greater than or equal to 0, wherein n is greater than or equal to 0, wherein m is not equal to n, wherein the quantizer includes a rule for processing information in an embedded representation at plural levels, wherein for each of the plural levels the quantizer has a dead zone in the level and plural non-dead zones in the level, wherein for each of the plural levels the quantizer uses clipping to limit range of classification regions in the level, wherein the range for the clipping varies between the plural levels, and wherein according to the rule for each level of one or more of the plural levels:

each of at least some of the plural non-dead zones in the level splits into m+1 non-dead zones in a higher level; and the dead zone in the level splits into a dead zone and n non-dead zones on each side in the higher level.

2. The quantizer of claim 1 wherein m >1.

3. The quantizer of claim 2 wherein m is 2.

4. The quantizer of claim 3 wherein n is 1.

5. The quantizer of claim 1 wherein n >1.

6. The quantizer of claim 1 wherein a dead-zone ratio for the quantizer is 1.

7. The quantizer of claim 1 wherein a dead-zone ratio for the quantizer is stable across the plural levels.

8. The quantizer of claim 1 wherein the computing system implements a still image codec that includes the quantizer.

9. The quantizer of claim 1 wherein the computing system implements a video codec that includes the quantizer.

10. The quantizer of claim 1 wherein the computing system implements an audio codec that includes the quantizer.

11. The quantizer of claim 1 wherein the clipping is not symmetric about zero.

12. The quantizer of claim 1 wherein the rule is a classification rule adapted for use in encoding of the information.

13. The quantizer of claim 1 wherein, for each level of the one or more of the plural levels, some but not all of the non-dead zones in the level are split into non-dead zones in the higher level, wherein a first clipping zone of the non-dead zones in the level is not split, the first clipping zone including negative values that are clipped, and wherein a second clipping zone of the non-dead zones in the level is split, the second clipping zone including positive values that are clipped.

14. An embedded dead zone plus uniform threshold quantizer executing in memory of a computing system, wherein the quantizer is characterized by integers m and n, wherein m is greater than or equal to 2, wherein n is greater than or equal to 1, wherein m is not equal to n, wherein the quantizer includes a rule for processing information in an embedded representation at plural levels for successively finer quantization of the information in the embedded representation, wherein for each of the plural levels the quantizer has a dead zone in the level and plural non-dead zones in the level, wherein the quantizer has a stable dead-zone ratio of 1 across the plural levels, wherein for each of the plural levels the quantizer uses clipping to limit range of classification regions in the level, wherein the range for the clipping varies between the plural levels, and wherein to refine the information in the embedded representation according to the rule for each level of one or more of the plural levels:

each of at least some of the plural non-dead zones in the level splits into m+1 non-dead zones in a higher level for successively finer quantization at the higher level; and the dead zone in the level splits into a dead zone and n non-dead zones on each side in the higher level for successively finer quantization at the higher level.

15. A method of encoding media information using a media encoder, the method comprising:

receiving media information;

with the media encoder, encoding the media information to produce encoded media information, wherein the encoding includes:

using an embedded dead zone plus uniform threshold quantizer characterized by integers ,n and n, wherein m is greater than or equal to 0, wherein n is greater than or equal to 0, wherein m is not equal to n, wherein the quantizer includes a rule for processing information in an embedded representation at plural levels, wherein for each of the plural levels the quantizer has a dead zone in the level and plural non-dead zones in the level, wherein for each of the plural levels the quantizer uses clipping to limit range of classification regions in the level, wherein the range for the clipping varies between the plural levels, and wherein according to the rule for each level of one or more of the plural levels:

each of at least some of the plural non-dead zones in the level splits into m+1 non-dead zones in a higher level; and the dead zone in the level splits into a dead zone and n non-dead zones on each side in the higher level; and outputting the encoded media information in a bit stream.

16. The method of claim 15 wherein m is 2 and n is 1.

17. The method of claim 15 wherein m and n have values selected from the group consisting of: m=2 and n=1, m=1 and n=2, m=2 and n=3 and m=3 and n=2.

18. The method of claim 15 wherein a dead-zone ratio for the quantizer is 1.

19. The method of claim 15 wherein a dead-zone ratio for the quantizer is stable across the plural levels.

20. The method of claim 15 wherein the media encoder is a still image encoder, video encoder or audio encoder.

21. The method of claim 15 wherein the range for the clipping is not symmetric about zero.

22. The method of claim 15 wherein m is at least 1, n is at least 1, and the quantizer has a stable dead-zone ratio of 1 across the plural levels.

23. The method of claim 15 wherein, for each level of the one or more of the plural levels, some but not all of the non-dead zones in the level are split into non-dead zones in the higher level, wherein a first clipping zone of the non-dead zones in the level is not split, the first clipping zone including negative values that are clipped, and wherein a second clipping zone of the non-dead zones in the level is split, the second clipping zone including positive values that are clipped.

24. A method of decoding encoded media information using a media decoder, the method comprising:

receiving encoded media information in a bit stream;

with the media decoder, decoding the encoded media information, wherein the decoding includes:

using an embedded dead zone plus uniform threshold quantizer characterized by integers m and n, wherein m is greater than or equal to 0, wherein n is greater than or equal to 0, wherein m is not equal to n, wherein the quantizer includes a rule for processing information in an embedded representation at plural levels, wherein for each of the plural levels the quantizer has a dead zone in the level and plural non-dead zones in the level, wherein for each of the plural levels the information has been clipped to limit range of classification regions in the level, wherein the range for the clipping varies between the plural levels, and wherein according to the rule for each level of one or more of the plural levels:

each of at least some of the plural non-dead zones in the level splits into m+1 non-dead zones in a higher level; and the dead zone in the level splits into a dead zone and n non-dead zones on each side in the higher level; and outputting results of the decoding.

25. The method of claim 24 wherein m is 2 and n is 1.

26. The method of claim 24 wherein m and n have values selected from the group consisting of: m=2 and n=1, m=1 and n=2, m=2 and n=3 and m=3 and n=2.

27. The method of claim 24 wherein a dead-zone ratio for the quantizer is 1.

28. The method of claim 24 wherein a dead-zone ratio for the quantizer is stable across the plural levels.

29. The method of claim 24 wherein the media decoder is a still image decoder, video decoder or audio decoder.

30. The method of claim 24 wherein the rule is a reconstruction rule adapted for use in the decoding of the media information.

31. The method of claim 30 wherein the reconstruction rule is a mid-point reconstruction rule or optimal reconstruction rule.

32. The method of claim 24 wherein m is at least 1, n is at least 1, and the quantizer has a stable dead-zone ratio of 1 across the plural levels.

33. The method of claim 24 wherein, for each level of the one or more of the plural levels, some but not all of the non-dead zones in the level are split into non-dead zones in the higher level, wherein a first clipping zone of the non-dead zones in the level is not split, the first clipping zone including negative values that are clipped, and wherein a second clipping zone of the non-dead zones in the level is split, the second clipping zone including positive values that are clipped.

34. A computing system comprising a processor, memory and storage, wherein the storage stores computer-executable instruction for causing the computing system to perform a method of encoding media information using a media encoder, the method comprising:

receiving media information;

with the media encoder, encoding the media information to produce encoded media information, wherein the encoding includes:

using an embedded dead zone plus uniform threshold quantizer characterized by integers m and n, wherein m is greater than or equal to 0, wherein n is greater than or equal to 0, wherein m is not equal to n, wherein the quantizer includes a rule for processing information in an embedded representation at plural levels, wherein for each of the plural levels the quantizer has a dead zone in the level and plural non-dead zones in the level, wherein for each of the plural levels the quantizer uses clipping to limit range of classification regions in the level, wherein the range for the clipping varies between the plural levels, and wherein according to the rule for each level of one or more of the plural levels:

each of at least some of the plural non-dead zones in the level splits into m+1 non-dead zones in a higher level; and the dead zone in the level splits into a dead zone and n non-dead zones on each side in the higher level; and outputting the encoded media information in a bit stream.

35. The computing system of claim 34 wherein m is 2 and n is 1.

36. The computing system of claim 34 wherein m and n have values selected from the group consisting of: m=2 and n=1, m=1 and n=2, m=2 and n=3 and m=3 and n=2.

37. The computing system of claim 34 wherein a dead-zone ratio for the quantizer is 1.

38. The computing system of claim 34 wherein a dead-zone ratio for the quantizer is stable across the plural levels.

39. The computing system of claim 34 wherein the media encoder is a still image encoder, video encoder or audio encoder.

40. The computing system of claim 34 wherein the range for the clipping is not symmetric about zero.

41. The computing system of claim 34 wherein m is at least 1, n is at least 1, and the quantizer has a stable dead-zone ratio of 1 across the plural levels.

42. The computing system of claim 34 wherein, for each level of the one or more of the plural levels, some but not all of the non-dead zones in the level are split into non-dead zones in the higher level, wherein a first clipping zone of the non-dead zones in the level is not split, the first clipping zone including negative values that are clipped, and wherein a second clipping zone of the non-dead zones in the level is split, the second clipping zone including positive values that are clipped.

43. A computing system comprising a processor, memory and storage, wherein the storage stores computer-executable instruction for causing the computing system to perform a method of decoding encoded media information using a media decoder, the method comprising:

receiving encoded media information in a bit stream;

with the media decoder, decoding the encoded media information, wherein the decoding includes:

using an embedded dead zone plus uniform threshold quantizer characterized by integers m and n, wherein m is greater than or equal to 0, wherein n is greater than or equal to 0, wherein m is not equal to n, wherein the quantizer includes a rule for processing information in an embedded representation at plural levels, wherein for each of the plural levels the quantizer has a dead zone in the level and plural non-dead zones in the level, wherein for each of the plural levels the information has been clipped to limit range of classification regions in the level, wherein the range for the clipping varies between the plural levels, and wherein according to the rule for each level of one or more of the plural levels:

each of at least some of the plural non-dead zones in the level splits into m+1 non-dead zones in a higher level; and the dead zone in the level splits into a dead zone and n non-dead zones on each side in the higher level; and outputting results of the decoding.

44. The computing system of claim 43 wherein m is 2 and n is 1.

45. The computing system of claim 43 wherein m and n have values selected from the group consisting of: m=2 and n=1, m=1 and n=2, m=2 and n=3 and m=3 and n=2.

46. The computing system of claim 43 wherein a dead-zone ratio for the quantizer is 1.

47. The computing system of claim 43 wherein a dead-zone ratio for the quantizer is stable across the plural levels.

48. The computing system of claim 43 wherein the media decoder is a still image decoder, video decoder or audio decoder.

49. The computing system of claim 43 wherein the rule is a reconstruction rule adapted for use in the decoding of the media information.

50. The computing system of claim 49 wherein the reconstruction rule is a mid-point reconstruction rule or optimal reconstruction rule.

51. The computing system of claim 43 wherein m is at least 1, n is at least 1, and the quantizer has a stable dead-zone ratio of 1 across the plural levels.

52. The computing system of claim 43, wherein, for each level of the one or more of the plural levels, some but not all of the non-dead zones in the level are split into non-dead zones in the higher level, wherein a first clipping zone of the non-dead zones in the level is not split, the first clipping zone including negative values that are clipped, and wherein a second clipping zone of the non-dead zones in the level is split, the second clipping zone including positive values that are clipped.

* * * * *